United States Patent [19]

Turner et al.

[11] Patent Number: 5,305,008
[45] Date of Patent: Apr. 19, 1994

[54] TRANSPONDER SYSTEM

[75] Inventors: Leigh H. Turner, Newton; Peter H. Cole, West Lakes Shore, both of Australia

[73] Assignee: Integrated Silicon Design Pty. Ltd., Australia

[21] Appl. No.: 941,322

[22] Filed: Sep. 4, 1992

Related U.S. Application Data

[63] Continuation-in-part of Ser. No. 741,408, Aug. 12, 1991, abandoned.

[51] Int. Cl.$^5$ .............................................. G01S 13/80
[52] U.S. Cl. ........................................ 342/44; 342/51
[58] Field of Search ............................ 342/44, 42, 51

[56] References Cited

U.S. PATENT DOCUMENTS

| | | | |
|---|---|---|---|
| 3,806,905 | 4/1974 | Strenglein | 342/50 X |
| 3,859,624 | 1/1975 | Kriofsky et al. | 342/44 X |
| 4,019,181 | 4/1977 | Olsson et al. | 342/42 |
| 4,068,232 | 1/1978 | Meyers et al. | 342/44 |
| 4,075,632 | 2/1978 | Baldwin et al. | 342/51 |
| 4,114,151 | 9/1978 | Denne et al. | 342/44 |
| 4,160,971 | 7/1979 | Jones et al. | 342/50 X |
| 4,388,524 | 6/1983 | Walton | 342/44 X |
| 4,450,431 | 5/1984 | Hochstein | 342/50 X |
| 4,654,658 | 3/1987 | Walton | 342/44 X |
| 4,656,472 | 4/1987 | Walton | 342/44 X |
| 4,694,297 | 9/1987 | Sewards | 342/45 |
| 4,786,907 | 11/1988 | Koelle | 342/51 |
| 4,911,217 | 3/1990 | Dunn et al. | 342/44 X |
| 4,926,187 | 5/1990 | Sugawara et al. | 342/361 |
| 4,983,976 | 1/1991 | Ogata et al. | 342/42 |
| 5,119,099 | 6/1992 | Haruyama et al. | 342/51 |

*Primary Examiner*—John B. Sotomayor
*Attorney, Agent, or Firm*—Larson and Taylor

[57] ABSTRACT

An identification and telemetry system comprising: a signal responding label including a first antenna for receiving an interrogation signal and for scattering a reply signal, an impedance connected to the first antenna, means for generating the reply signal and means for varying the impedance connected to the first antenna in accordance with the reply signal; and an interrogator comprising a second antenna for transmitting an interrogation signal and for receiving the reply signal, a transmitter connected to the second antenna and including a generator of pulsed radio frequency energy, means for separating the reply signal from the transmitted signal, a receiver connected to the second antenna and means within the receiver for detecting and decoding the reply signal.

44 Claims, 12 Drawing Sheets

SERIES RESONANT CIRCUIT

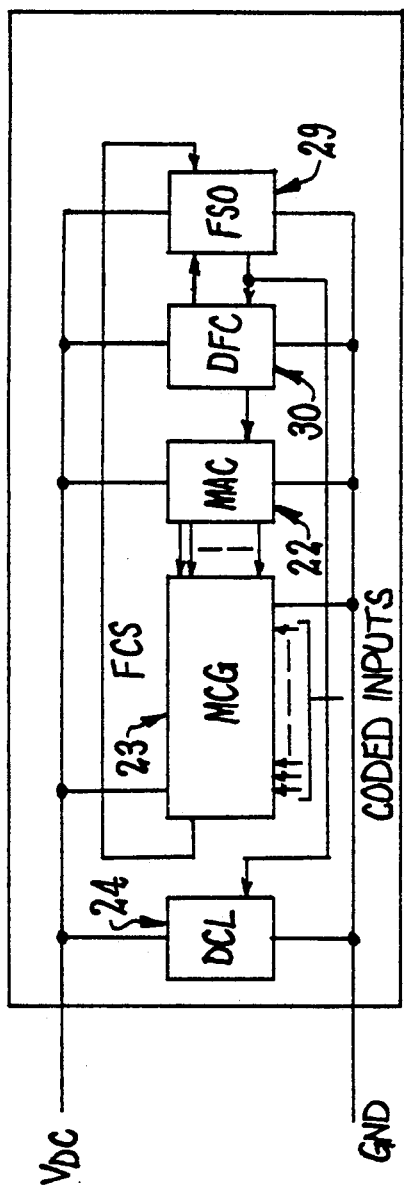
FIG 6
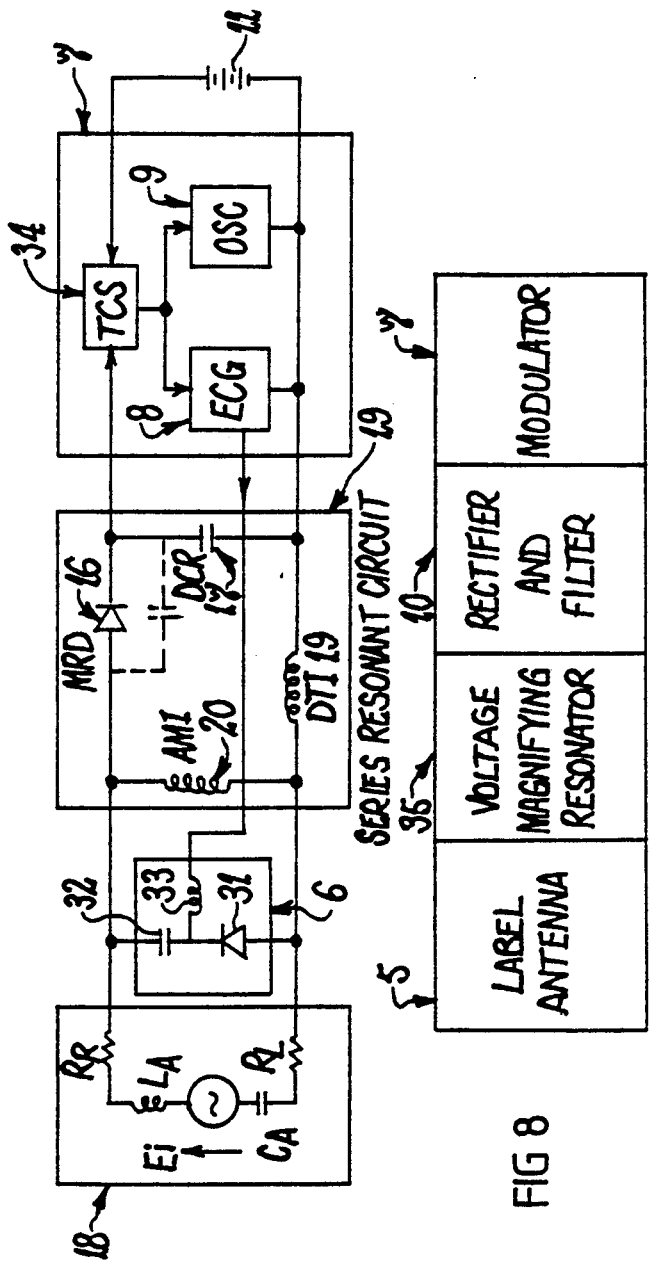
FIG 7
FIG 8

TRANSPONDER SYSTEM

CROSS REFERENCE TO RELATED APPLICATION

This a continuation-in-part of Ser. No. 741,408 filed Aug. 12, 1991 now abandoned.

BACKGROUND OF THE INVENTION

The present invention relates to a Transponder System. In particular the invention relates to remote identification and telemetry systems wherein an electronic sub-system called an interrogator including a transmitter and receiver extracts by electromagnetic means useful information from an electronically coded label, sometimes known as an electronic tag, attached to a person or object about which information is desired.

A block diagram of a type of system to which the invention relates is shown in accompanying FIGS. 1A and 1B. This system uses the principle of radio frequency backscatter in which an interrogator containing a transmitter radiates an electromagnetic signal via an interrogator antenna toward an electronic label containing a label antenna. As a consequence of electromagnetic coupling between the label antenna and the interrogator antenna, the label receives a portion of the radiated signal. In the label, the impedance of a termination connected to the label antenna may be varied in time under control of a modulator containing an electronic code generator, with the result that electromagnetic energy received by the label antenna is both partially reflected by the termination and re-radiated by the label antenna in a time varying manner. As a further result of the electromagnetic coupling between the label antenna and the interrogator antenna, a portion of the time varying radio frequency signal scattered by the label may enter a receiver included within the interrogator wherein it may be separated from the transmitted signal, amplified. decoded in a decoder and presented in digital or analog form to other systems which may make use of the information obtained by the interrogation.

In the label, operations of the code generator and variable termination may be controlled in time by an oscillator. In a passive label the circuits within the modulator may receive power for their operation from a rectifier circuit, while in an active tag they may receive at least part of their operating power from a separate energy source, for example a battery. When the rectifier circuit is present, the effects of the time varying termination can be provided by the rectifier circuit itself, in which variation of dc load directly presented to the rectifier by the modulator may cause a corresponding variation in the load presented by the rectifier to the label antenna.

In the interrogator, there may generally be provided a controller which may perform various calculation and control functions and may also participate in the decoding process.

Practical applications of such labelling and interrogation systems lie in identification of, and or monitoring condition of, such things as persons, goods, shipping containers, pets and livestock. In the latter case, the tags are sometimes attached to the exterior of the animal, and are sometimes implanted beneath the skin.

In the practical design of such systems various problems arise. In a passive tag, one problem is that of obtaining from the rectifier circuit sufficient voltage for operation of the modulator circuits within the label at a transmitter power level sufficiently low to meet licensing, economic or health requirements.

A further problem, applying principally to passive labels, derives from significant variation in strength of the electromagnetic field normally experienced by a label as it moves throughout an electromagnetically scanned area. For the type of oscillator circuit which it is practicable to use in the most economically manufactured integrated electronic labels, this variation of field strength and hence rectified dc voltage causes significant consequential variation in frequency of the on-chip oscillator. Since almost all forms of reply signal encoding employ time as an important parameter, such variation can cause difficulties or errors in decoding, or may require that a significant portion of the information in the reply be devoted to the task of indication of frequency of the on-chip oscillator. In normally used forms of reply signal decoding, circuits in the receiver must firstly detect the frequency of the modulation signal used in constructing a reply, and after this frequency is detected, determine the reply signal information content. If the label is, by virtue of its motion, only exposed to the interrogation signal for a limited period, a portion of which is used in frequency determination, the amount of useful information which is recoverable from the label is limited by the problem discussed.

Although this problem can be alleviated to a degree by use of a voltage regulator within the label, the label rectifier system must then supply for satisfactory operation the sum of the voltage drop required across the regulator and the minimum operating voltage for the oscillator circuit, with the result that an effective reduction in label interrogation range occurs.

A further problem, which affects labels being read at all but very short distances, is that the reply signal reaching the interrogator antenna is very weak in relation to the interrogation signal and yet occupies a very similar region of the frequency spectrum. The receiver is therefore very susceptible to any component of the phase noise spectrum of the transmitter which may reach it. The usual technique for separation of the reply from the interrogation signal involves firstly use a circulator or directional coupler to effect gross separation of signals flowing in the forward and reverse directions in the interrogator antenna transmission line, and then to use linear signal mixing to move the reply signal to a lower frequency band, wherein amplification and filtering may be conveniently applied.

In the gross separation discussed above, the effectiveness depends upon the degree of isolation which may be achieved by the coupler or circulator, and also on the extent to which the interrogator antenna is matched to its transmission line, as imperfections in antenna matching have the same effect as imperfect isolation in the coupler or circulator. If insufficient matching is achieved, the mixer which effects frequency conversion of the reply signal will become overloaded by the imperfectly removed interrogation signal, and will not function properly, and in addition excessive noise, generated within the transmitter as near sidebands of the interrogation signal, will reach the receiver. The result is that extremely accurate interrogator antenna matching is required for successful system operation at large interrogation ranges. Such extremely accurate matching cannot normally be sustained in the face of typically encountered changes over time in the antenna environment, including those introduced by movement of labelled and unlabelled objects within the field of the antenna, so the hoped for interrogation range is not achieved, even though the reply signal level be well above both thermal noise and the level of other stray reflected signals in its pass band.

A further problem is present in homodyne detection systems normally used for detection of the reply signal. In such systems a low power version of the transmitted signal is used in the interrogator receiver as the local oscillator for the linear mixer which transforms the reply signal to the previously said lower frequency band. Because the reply is derived by direct modulation within the tag of the transmitted signal, there will be phase coherence between the reply and the local oscillator derived from the transmitter. The result will be that the mixer will produce zero base band output whenever the reply is in quadrature with the local oscillator, as indeed it will be whenever the difference in propagation times from the transmitter to mixer, via the tag and via the local oscillator sampling path, is a quarter of a period of the transmitter oscillation. Because in a radio frequency backscatter system the phase of the reply varies considerably as the label moves within the scanned area, this effect will produce positions of the label for which no reply is observed.

The usual way in which this problem is met is to divide the reply signal into two portions, each being fed to a separate mixer, the two mixers having local oscillator signals derived from the transmitter but with a ninety degree relative phase shift, the mixer outputs being again combined to a single data stream after one of them has been provided with a further ninety degree phase shift at the base band frequency. Although this remedy does produce a form of base band signal for all positions of a label with linear amplitude or angle modulation of the interrogation signal, the base band signal so obtained contains distortion which may prejudice successful decoding unless the spectrum of the signal is relatively narrow band, i.e. takes the form of a modulation signal of limited bandwidth superimposed on a significantly higher frequency sub-carrier. Since the frequency of this sub-carrier can be no greater than the frequency of the oscillator within the tag from which it is derived, and since considerations of economical use of power received by the tag set a practical upper limit to this frequency, the need in this kind of detection system to use a narrow band modulation sets an unwelcome limit to the rate at which data may be transmitted within the reply, and a consequential limit to the amount of data which may be recovered from a label which by virtue of its motion is within the interrogation field for only a short period of time. As will be explained in more detail later, there are in addition, in the replies from practical labels, departures from the idealised forms of modulation of the interrogation signal for which this style of interrogator receiver is not suited, in that for some positions of such practical labels no reply might be observed.

SUMMARY OF THE INVENTION

The present invention may provide a passive radio frequency backscatter identification and telemetry system which possesses increased interrogation range while maintaining interrogation power within acceptable limits. The invention may further provide a radio frequency backscatter tag or passive interrogatable label which allows robust and economical encoding of information content of the reply signal. A radio frequency backscatter interrogation system according to the present invention may enable reliable collection of data in the face of substantial variation in tag oscillator frequency, and may enable collection of relatively long data streams from rapidly moving objects. An identification and telemetry system according to the present invention may permit simple detection and decoding of the reply signal.

The invention may provide for detection of the presence and movement of objects as well as for reading of the information from labels attached thereto. The invention may also provide through shaping of the envelope of the interrogator waveform an enhanced interrogation range. The invention may also provide, for objects which move rapidly through the interrogation region, more frequent interrogations over a limited time.

The invention may provide practical apparatus for remote identification and telemetering using electronic coded labels. The apparatus may include an electronic label with an antenna which receives radio frequency energy from an interrogation field created by the transmitter in an interrogator. Through the mechanism of modulated rf backscatter, in which the impedance connected to the label antenna may be periodically modulated by an electronic code generator circuit within the label, the label may return part of that energy in the form of a coded reply signal to a receiver in the interrogator.

The label may contain a rectifier to convert a portion of the rf signal received by the label antenna to a direct current, for the purposes either of initiating operation of or providing power for the electronic code generating circuits.

The effective interrogation range of the system may also be enhanced by incorporation within the label of an optimally configured rf voltage magnifying resonator circuit, which may be placed between the label antenna and the dc rectifier system, with the result that the dc output voltage for a given incident rf field may be greatly increased, while the efficiency which the label operates as a generator of backscatter signals is maintained.

A further enhancement of interrogation range may be achieved through appropriate shaping of the envelope of the interrogation signal generated by the transmitter. This increase is a consequence of several factors. One is that for detection of object presence or movement, only a low transmitted power is required. A second is that for a passive label to correctly generate its reply, a certain threshold voltage must be reached in the output of the rectifier therein. A third is that the frequency of an on-chip oscillator within a passive label generally varies substantially with such rectifier output voltage. A fourth is that the most effective label information encoding schemes require coherent operation of such on-chip oscillator over the period of time required for the generation of a complete label reply. A fifth is that in most applications continuous interrogation of labels is not required, but there is instead a required maximum interval between collections of label information. A sixth is that health and radio licensing considerations limit the average power which may be used in the transmitter of the interrogator over a defined averaging period, and also limit the ratio of peak to average power which may be employed over that period. Suitable shaping of the envelope of the interrogation signal may provide an increase, appropriate to the achievement of optimum interrogation range, in the operating voltage in the label which is possible under statutory constraints limiting interrogator signal power, while maintaining acceptable intervals between interrogations.

The interrogator of the system may contain means for improving the accuracy of decoding of replies from labels in which the oscillator frequency varies as the label moves within the often irregular interrogation field.

One method by which this may be achieved is by arranging the interrogator to capture a complete record of the label reply before an attempt to decode that reply is made. An advantage of the method of capture and decode later is that it may eliminate loss of part of the reply information which occurs in the generally used real-time decoding circuits which require a period of synchronisation with the reply signal before they are effective, and hence may enable successful decoding of replies from labels which as a consequence of their motion, reside which the interrogation field for only a brief period.

The present invention may provide a compact circuit for reliable decoding or replies, containing frequency shift keying modulation, originating in practical labels in which oscillator voltage varies over reply time as a result of variation during label movement of the dc voltage developed in the label rectifier.

The present invention may include a phase locked loop frequency decoder, together with a band-pass filter interposed between the frequency decoder and the circuit which interprets transitions in reply frequency, to recover a serial bit stream containing the reply code. An advantage of this circuit is that no special precautions to stabilise the power supply within the label may be required, and the label in consequence may operate with a smaller dc output voltage from the rectifier, and greater interrogation range results.

The interrogation may incorporate circuits for adaptive cancellation of variable reflections from both labelled and non labelled objects moving within the interrogator field of view. Such reflections, if not cancelled, can cause overload of sensitive detector circuits within the receiver, and the introduction of transmitter phase noise into the reply signal path. An advantage of cancellation of the reflections is that it may permit use of a much greater transmitter power than is otherwise practicable, with a consequent significant increase in interrogation range.

BRIEF DESCRIPTION OF THE DRAWINGS

Preferred embodiments of the present invention will now be described with reference to the accompanying drawings wherein:

FIG. 6 shows an internal arrangement of a third form of label modulator;

FIG. 7 shows an circuit representation of a third form of coded label;

FIG. 8 illustrates four important functions performed within the coded label;

DETAILED DESCRIPTION OF PREFERRED EMBODIMENTS

Figure 1A:
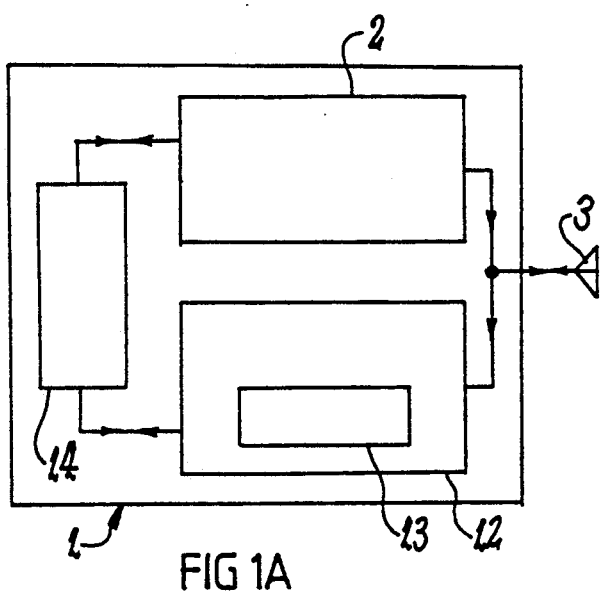
FIGS. 1A and 1B show major sub-units of an identification or telemetry system containing an interrogator and coded label.
Figure 1B:
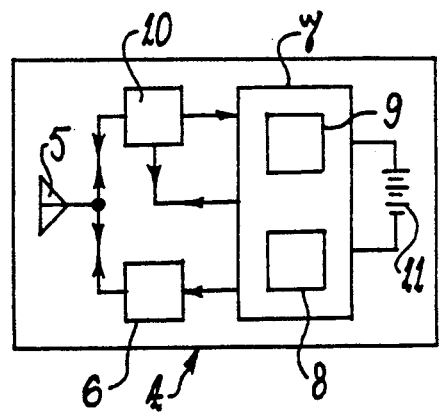

FIG. 1A shows major sub-units of an interrogator 1 containing a transmitter 2 which radiates via interrogator antenna 3 an electromagnetic signal toward an electronic label shown in FIG. 1B. Label 4 contains a label antenna 5. As a consequence of electromagnetic coupling between label antenna 5 and interrogator antenna 3 the label receives a portion of the radiated signal. In the label, the impedance of a termination 6 connected to label antenna 5 is varied in time under control of a modulator 7 containing an electronic code generator 8, with the result that electromagnetic energy received by label antenna 5 is both partially reflected by the termination and re-radiated by label antenna 5 in a time varying manner. As a further result of electromagnetic coupling between label antenna 5 and interrogator antenna 3 a portion of the time-varying radio frequency signal scattered by label antenna 5 enters receiver 12 included within interrogator 1 wherein it is separated from the transmitted signal, amplified, decoded in decoder 13 and presented in digital or analog form to other systems which may make use of the information obtained by the interrogation.

In the label, operations of code generator 8 and variable termination 6 are controlled in time by an oscillator 9. In a passive label circuits within modulator 7 receive power for their operation from a rectifier circuit 10, while in an active tag they receive at least part of their operating power from a separate battery 11. When rectifier circuit 10 is present, the effects of a time varying termination can be provided by the rectifier circuit itself, in which variation of dc load directly presented to the rectifier by the modulator causes a corresponding variation in load presented by rectifier circuit 10 to label antenna 5.

Interrogator 1 includes a controller 14 which performs various calculation and control functions and may also participate in the decoding process.

Figure 2A:
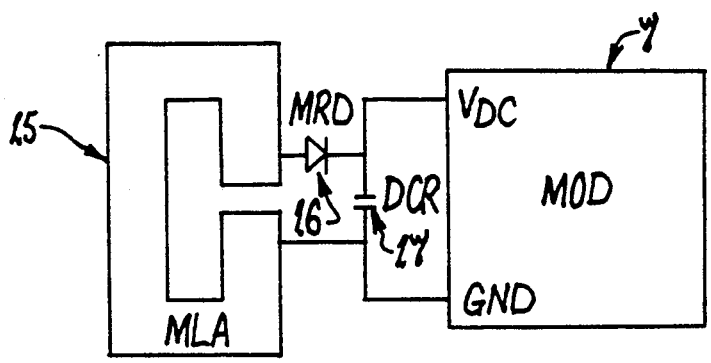
FIGS. 2A and 2B show physical and circuit representations respectively of antenna and rectifier in one form of coded label.
Figure 2B:
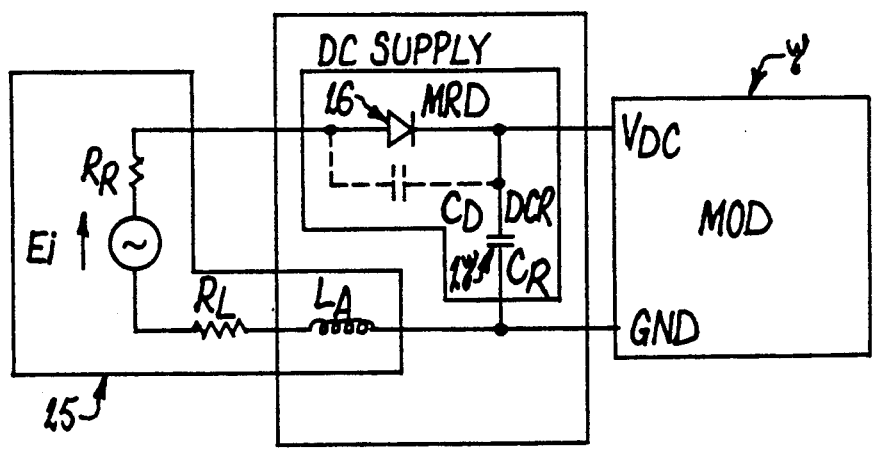

FIGS. 2A and 2B show one preferred embodiment of coded label. In FIG. 2A physical aspects of some components are illustrated, while in FIG. 2B, circuit aspects of the corresponding components are represented.

In the preferred embodiment shown in FIG. 2A, the label contains a magnetic loop antenna (MLA) 15 connected to a rectifier circuit containing a microwave rectifier diode (MRD) 16 and dc reservoir capacitor (DCR) 17. The reservoir capacitor 17 is connected to a modulator (MOD) block 7 details of which will be described later.

In FIG. 2B, circuit elements $R_R$ and $R_L$ represent radiation and loss resistance respectively of MLA 15, $L_A$ represents self inductance of MLA 15, $C_D$ represents junction capacitance of MRD 16, $C_R$ represents capacitance of reservoir capacitor DCR 17, and $E_i$ represents open circuit rf voltage induced in MLA 15 by reception of the interrogation signal.

In the system illustrated in FIG. 2A, MLA 15 takes the form of an electrically small, i.e. dimensions much less than a wave length, inductive loop, responding to the magnetic field component of the incident electromagnetic field. The dimensions of the loop are chosen to be as large as possible, consistent with the size requirements of the label and with a requirement that the self inductance of the loop forms at the frequency of interrogation a resonant circuit with the junction capacitance of rectifier diode 16.

The use of a small magnetic field responding antenna provides several benefits. Firstly the antenna is immune to sensitivity loss when placed in close proximity to lossy dielectric media, as often occurs with labels in practice, an example being when the label is used as a personnel identification or security tag. Secondly sensitivity of the label is enhanced when it is placed in the field of an electromagnetic wave reflected from a partially-conducting or well-conducting surface, as although such reflection causes a reduction in the electric field strength close to the reflecting medium, the magnetic field in that region is enhanced. In the extreme case when the label is to be implanted beneath the skin of an animal, enhancement of the magnetic field as opposed to the very substantial reduction of the electric field when the incident wave is reflected a the animal surface, provides a great increase in label sensitivity over the labels using the commonly chosen electric dipole antenna.

Use in the label illustrated in FIG. 2A of a magnetic field responding antenna carries another significant benefit. The extent to which it is possible to derive by reception from the interrogation field a sufficient voltage to provide satisfactory operation of electronic circuits in the modulator, depends firstly on the received voltage of the antenna, and secondly on the extent to which this voltage may be magnified by passive circuit techniques. The inventors have shown that the optimum circuit technique is to ensure that there is resonance at the frequency of interrogation between the junction capacitance of the rectifier diode and a low loss inductor, with dynamic impedance of the resonant circuit being well matched to the radiation impedance of the antenna. The voltage magnification achieved is equal to the quality factor of the resonant circuit. The choice of a magnetic field responding antenna allows this resonance to be achieved with particularly high quality factor, and with a minimum number of external components, and consequent reduction both of further electrical losses and physical size and cost of the label.

The inventors have also shown that the use of capacitance, other than the reservoir capacitance, in addition to the junction capacitance of the diode anywhere in the resonator will increase the capacitive reactive power required to establish a given rectifier output voltage, and that such additional reactive power must, for resonance to be maintained, be supported by an equivalent inductive reactive power, and as a consequence the losses in the resonator are increased, and a greater interrogator power is required to sustain proper operation of the label.

Figure 3A:
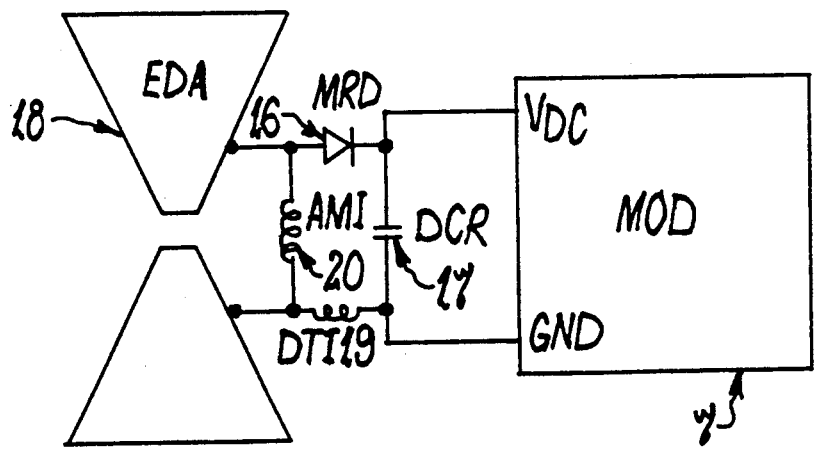
FIGS. 3A and 3B show physical and circuit representations respectively of antenna and rectifier in a second form of coded label.

In another preferred embodiment, shown in FIG. 3A, the label contains an electric dipole antenna (EDA) 18 connected to a rectifier circuit, again containing a microwave rectifier diode (MRD) 16 and dc reservoir capacitor (DCR) 17. Reservoir capacitor 17 is again connected to a modulator (MOD) block 7, the detail of which will be described later. The connection between EDA 18 and rectifier 16 this time contains an antenna matching inductor (AMI) 20.

Figure 3B:
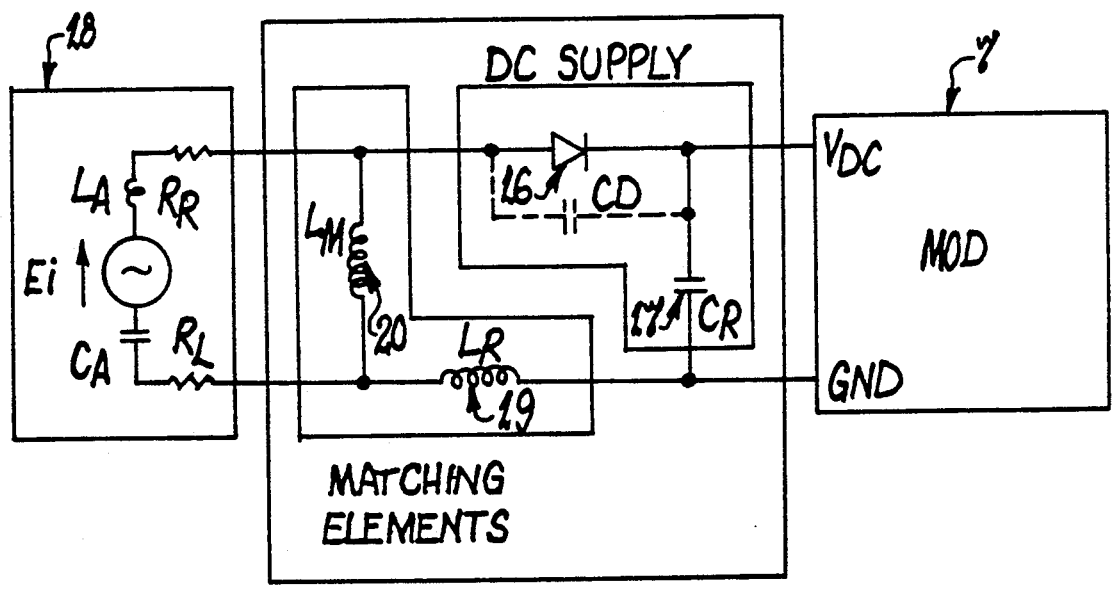

In FIG. 3B, circuit elements $R_R$ and $R_L$ again represent radiation resistance and loss resistance of EDA 18, $L_A$ and $C_A$ represent frequency behaviour of EDA reactance, $L_M$ represents inductance of the matching reactance, $L_R$ represents inductance of the resonating reactance, $C_D$ again represents junction capacitance of MRD 16, $C_R$ represents capacitance of reservoir capacitor 17 of the rectifier, and $E_i$ again represents open circuit voltage induced in EDA 18 by reception of the interrogation signal.

In the system illustrated in FIG. 3A, EDA 18 may take the form of either an electrically large or small electric dipole. The dimensions of this antenna are normally chosen to be as large as possible consistent with size requirements of the label, and when a large antenna can be used the benefits of wide bandwidth and consequential relative immunity to detuning are realised.

Passive voltage magnification is in this embodiment realised through provision of resonating inductor 19 of which inductance $L_R$ supplemented by a small contribution from $L_M$ forms at the frequency of interrogation a resonant circuit with the junction capacitance of the rectifier diode. The functions of matching inductor (AMI) 20 are firstly to provide a dc return for the rectifier circuit, and secondly to ensure that radiation impedance of EDA 18 is well matched to the dynamic impedance of a voltage magnifying circuit. The inventors have shown that an important characteristic of the passive voltage magnifying circuit is that the stored electric energy of the resonance process is substantially that present in the diode junction capacitance. This is the condition for optimum passive voltage magnification with an electrically large antenna.

The inventors have also shown that an aspect of the optimum design of the resonator is that the pass band of the resonance should include not only the interrogation frequency but also the significant sidebands of that frequency produced by the reply generation process, so that a change of the antenna reflection factor may be affected by the modulator sufficiently rapidly for a strong reply signal to be generated. As high voltage magnification is desired, the modulation frequency should be a small fraction of the interrogation frequency.

Figure 4:
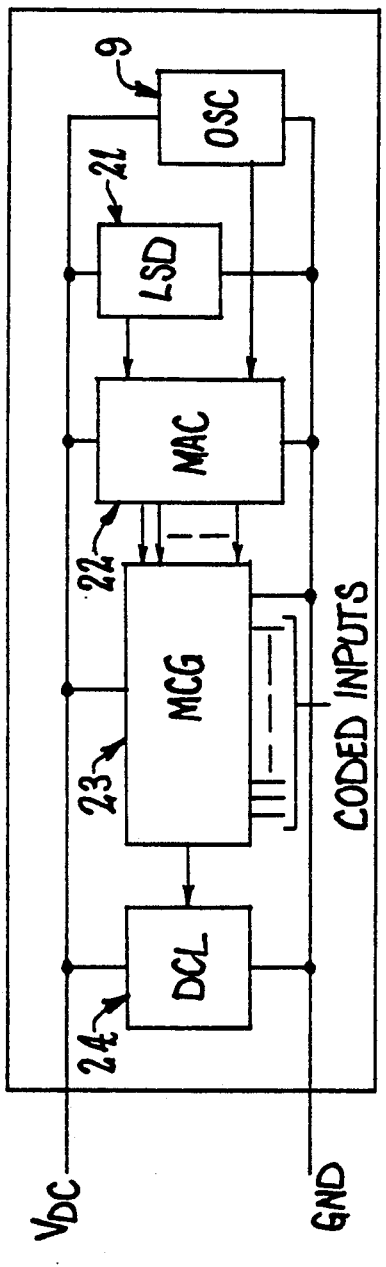
FIG. 4 shows an internal arrangement of one form of label modulator.

FIG. 4 shows one preferred embodiment of label modulator 7. It contains a self contained oscillator (OSC) 9, a level sensitive detector (LSD) 21, a multiplexer address counter (MAC) 22, and a multiplexer code generator (MCG) 23, with inputs which are either left open or tied low to provide a digital one or zero respectively in the code, and a digitally controlled load (DCL) 24.

The label modulator comes into operation when the output voltage from the rectifier system 10 is sufficient to produce regular oscillations from the oscillator block 9, and also to cause the single bit digital output of level sensitive detector 21 to take a high state. When these conditions are met, multiplexer address counter 22 cycles sequentially through all address states, so that the multiplexer samples in order all inputs, and produces at its output a cyclic repetition of the reply code programmed at those inputs. So that the code is produced without error, the threshold of operation of level sensitive detector 21 is set to a value at which reliable operation of the oscillator, counter and multiplexer circuits is assured. The output of the multiplexer code generator 23 is connected to a digitally controlled load 23, which provides the required variation in load presented to rectifier circuit 10 within the label.

In this modulation scheme, the multiplexer may provide simple amplitude modulation of the rf signal scattered by the label, or may if given a number of inputs substantially in excess of the number of bits to be encoded, implement number of different modulation schemes including frequency shift keying and amplitude or phase modulation of a sub carrier. Such sub carrier modulation schemes are to be preferred to simple base band modulation, as they suffer less in detection of replies from background clutter generated by naturally occurring objects in the field of view of the interrogator.

Such sub carrier modulation schemes can be generated by means other than that just described, most usually through interposition of an additional functional block between multiplexer code generator 23 and the digitally controlled load 24. In an alternative embodiment to that shown in FIG. 4, the MAC 22 can increment each four cycles of OSC 19, and the output of MCG 23 can be combined with the output of OSC 9 in an exclusive-or gate before being presented to DCL 24, to accomplish phase shift keying of the reply sub carrier with four sub carrier cycles per information bit.

In generation of information to be contained within the reply code, some multiplexer inputs may be committed to the provision of identity information through being permanently either tied low or left open, while some may be connected to other circuits which provide in a telemetry application variable information. An example would be provided by connection, to one of the multiplexer inputs in an implanted animal label, of an output of a comparator of which the input is connected to a resistance bridge containing a thermally sensitive resistor. Such a label could provide an indication of animal identity together with a single-bit indication of animal health. An obvious alternative method of including telemetry information is to make the frequency of the oscillator 9 an information bearing parameter. An example is provided by an implanted animal label in which natural temperature dependence of certain designs of oscillator circuit may be used to indicate animal temperature.

Figure 5:
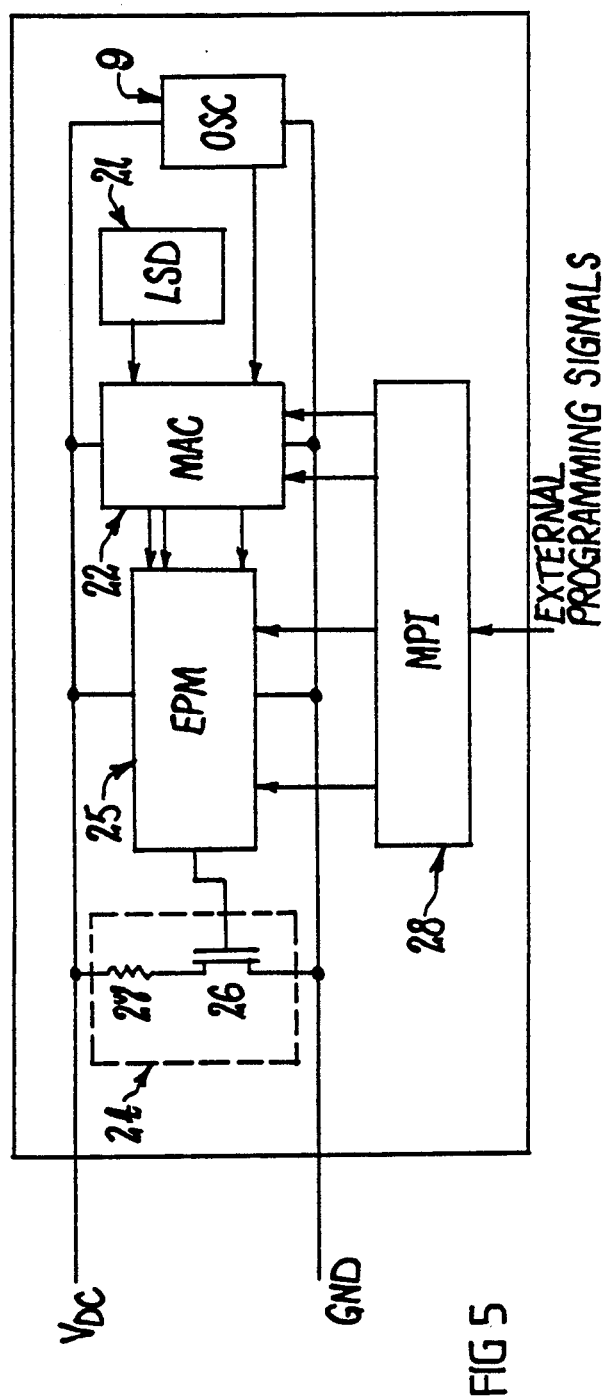
FIG. 5 shows an internal arrangement of a second form of label modulator.

FIG. 5 shows another preferred embodiment of modulator 7. It substitutes an electrically programmable and erasable memory (EPM) 25 for the previously discussed multiplexer code generator 23, but in other ways resembles the structure shown in FIG. 4.

FIG. 5 also shows a possible realisation of digitally controlled load 24 in the form of a field effect transistor 26 with current limiting resistor 27. By appropriately proportioning transistor 26 and resistor 27, an impedance vs voltage characteristic matching the characteristic of the dc supply output impedance vs voltage level over a suitable range of power level may be achieved.

Programming of memory 25 is achieved through programming interface (MPI) 28, which may accept external programming signals either by direct connection or by appropriate non contact electromagnetic coupling means.

FIG. 6 shows another preferred embodiment of modulator 7, suited to efficient generation of a reply signal with frequency shift keying modulation. In this embodiment oscillator 29 of which the frequency may be switched between values of approximately 250 and 400 kHz in response to frequency control signal FCS is counted down by divide-by-four counter (DFC) 30. The output of the divide-by-four counter is provided as a clock signal to multiplexer address counter (MAC) 22 the outputs of which, as in the modulator of FIG. 4, cycle sequentially through all address states, so the multiplexer code generator (MCG) 23 again samples in order all inputs, which are either left open to represent a one or tied low to represent a zero, and produces at its output a cyclic repetition of the reply code programmed at those inputs. The output of multiplexer code generator 23 and the output of the divide-by-four counter 30, are used as the frequency control signals of the frequency switched oscillator 29, in such a way that if at the end of each count of four oscillator cycles the FCS signal is high, the oscillator frequency does not change, while if at the end of each count of four oscillator cycles the FCS control signal is low, the oscillator frequency will switch to the alternate value. The output of the frequency switched counter 29, as well as being fed to the divide-by-four counter 30, is also fed to the digitally controlled load (DCL) 24 to effect modulation of antenna impedance at the currently effective rate of the reply sub carrier.

The overall effect of the modulator is to produce a differential frequency shift keying modulated sub carrier signal with modulation frequencies equal to the two possible oscillator frequencies, and with always four sub carrier cycles per information bit. It is a consequence of this fact and the variation of sub carrier frequency that the time allocated to each bit of the reply code will vary, and significantly so when a desirably large separation is employed in the two sub carrier frequencies produced by oscillator 29.

This form of label circuit design has the advantages that circuits within the label are simple, and operate at low frequencies and thus with little power consumption, these features leading to low manufacturing cost and long interrogation range. The labels also require at most one frequency transition per reply bit, and can in consequence allocate only a small number, in this embodiment four, of reply sub carrier cycles to each reply bit, and have the consequential advantage that they can produce long replies in a relatively short interrogation time. The variation of time allocated to each reply bit, however, has consequences, which will be discussed later, for the design of a suitable interrogator for this form of label.

FIG. 7 shows another preferred embodiment of label in which the label again contains an electric dipole antenna (EDA) 18 of which the circuit representation is shown. EDA 18 is connected to a rectifier circuit, again containing a microwave rectifier diode (MRD) 16 and dc reservoir capacitor (DCR) 17. In this embodiment reservoir capacitor 17 is again connected to modulator 7, but the dc output voltage developed in capacitor 17 serves only to activate timed control switch (TCS) 34, which connects for a period of time after the said dc voltage is detected, power from battery 11 to oscillator (OSC) 9 and electronic code generator (ECG) 8.

Because power for operation of those circuits comes from a battery, and the rectifier system is required only to provide negligible power required to initiate opening of the control switch, the quality factor and hence voltage magnification of the tuned circuit containing the rectifier capacitance can be higher than in the previously discussed designs. The result is a significant increase in interrogation range for the label.

In accord with the different use in this embodiment of label of the dc voltage from the rectifier, modulation of the antenna terminating impedance is provided directly through control of antenna impedance connected to the rectifier. Components comprising the controllable antenna termination are PIN diode 31, bypass capacitor 32 and rf isolation inductor 33. After modulation is applied, the timed control switch derives its operating power from battery 11. This direct control of the antenna terminating impedance can produce very efficient rf backscatter signal generation.

FIG. 8 shows important functional characteristics of the label circuits illustrated in FIGS. 2B, 3B and 7, and may be used to better explain the operation of those circuits. In each of the embodiments shown in those figures, the label contains a label antenna 5, a voltage magnifying resonator 35, a rectifier and filter 10, and a modulator 7.

Several characteristics of these functional blocks may be noted. The first is that the physical elements which provide the indicated functions are in some cases shared between blocks. Examples of this sharing include the self inductance of magnetic antenna loop in FIG. 2B which provides the resonating inductance of the voltage magnifying resonator, and the microwave diode in FIGS. 2B, 3B and 7 which provides both the resonating capacitance of the voltage magnifying resonator, and the unidirectional current element of the rectifier and filter. The second is that the electrically important circuit elements is in one case the aberrant (stray) rather than the principal characteristic of the circuit device used. This statement refers to the voltage magnifying resonator, in which the electrical energy storage element is the junction capacitance of the rectifier diode.

It is the characteristics just mentioned which provide for maximisation, in each of the three label embodiments described, of passive voltage gain of the circuit, and consequent maximisation of interrogation range for given interrogation power.

In practical application of principles outlined in relation to FIGS. 2, 3 and 7, it is necessary to take into account the fact that diode junction capacitance depends on excitation level, and to adjust the size of the resonating inductance $L_A$ or $L_R$ for a desired operating signal level in the label.

The inventors have found that the change in diode capacitance with change in dc voltage output from the rectifier is sufficient to change the resonant frequency of the resonator by an amount greater than its bandwidth. So that the systems of the interrogator and the label will operate at the greatest practicable range, the inductive components of the resonator should be adjusted so that resonance at the interrogation frequency occurs for that rectifier output voltage level for which the modulator is at the lower voltage threshold of its correct operation.

All of these considerations apply whether there is a single diode of a plurality of diodes in the rectifier circuit.

There is a further consequence to the fact that the capacitance of the rectifier diode junction, and of the components which may be involved in the process of generation of the backscattered signal, varies with voltage level. Although the backscatter generation system may be designed to generate a reply signal, in the form of sidebands of the interrogation signal, through the imposition upon the antenna backscattered signal of one particular form of modulation, for example amplitude modulation or phase modulation, the detuning of resonant circuits within the label, either as a result of variation in signal amplitude or of proximity of the label to other objects, has the effect that the signal returned by some labels, although still carrying the information desired, can have a form of modulation other than that intended.

The inventors have found, for example, that passive label circuits of desirably simple design, and in consequence of low manufacturing cost, although designed to produce phase shift keying of a sub-carrier, will at low signal levels produce a form of modulation of the sub-carrier more resembling frequency shift keying. This change in form of modulation has consequences which will be discussed later for the design of interrogator systems which will correctly recover information from such labels.

Figure 9:
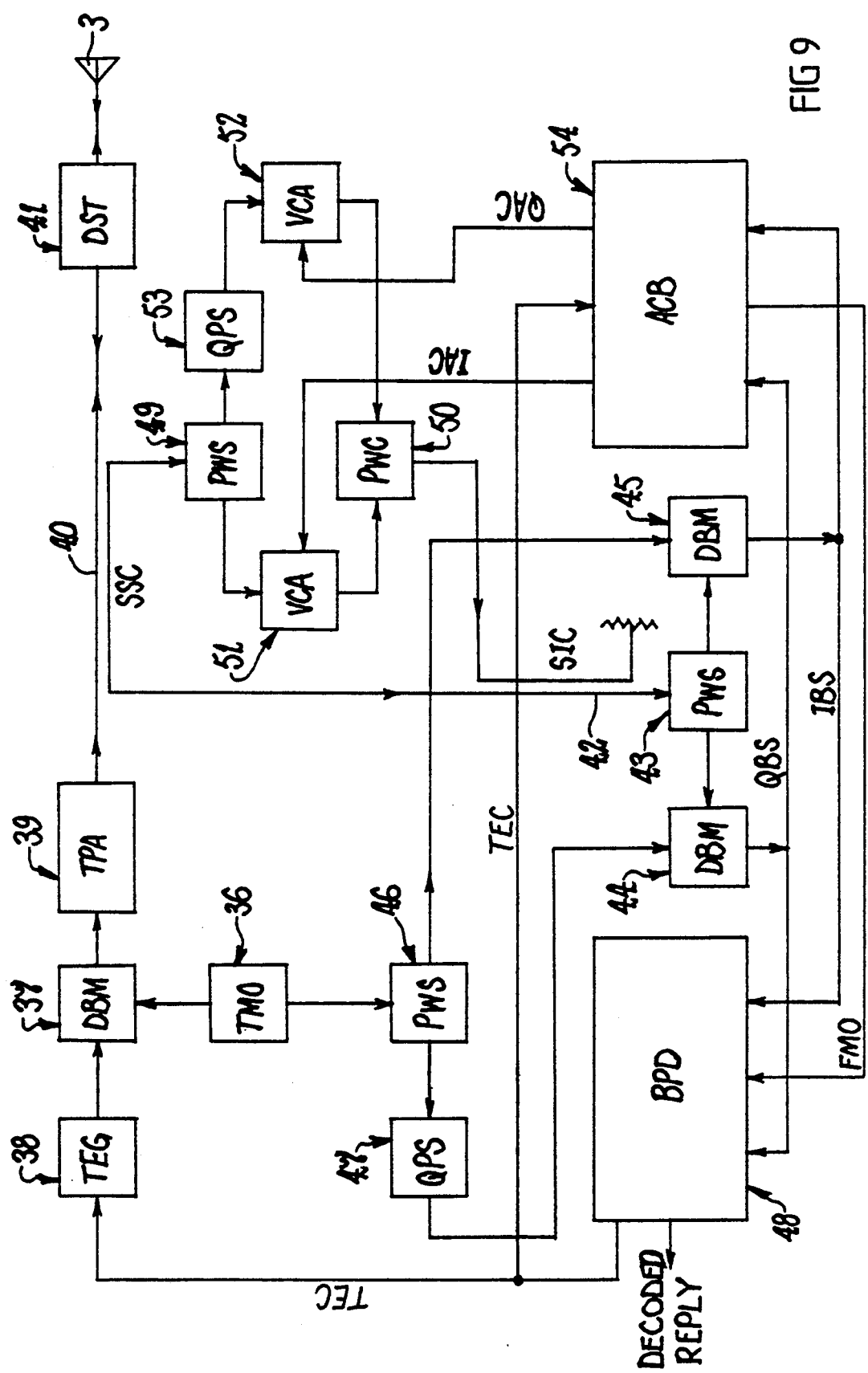
FIG. 9 is a block diagram of an interrogator for a coded label.

FIG. 9 shows a block diagram of one preferred embodiment of interrogator. The interrogation signal has its origin in radio frequency transmitter master oscillator (TMO) 36, and is amplitude modulated by means of double balanced mixer (DBM) 37, of which the control input is derived from transmitter envelope generator (TEG) 38. The modulated output of mixer 37 is applied to transmitter power amplifier (TPA) 39, and is conveyed to interrogator antenna 3 by means of signal sampling directional coupler (SSC) 40 and double stub tuner (DST) 41, the function of which will be described shortly.

There is an important practical consequence of the use of amplitude modulation in the transmitter output signal. Modulation with an appropriate envelope, such as that shown in FIG. 10 and described in more detail later, allows continuous monitoring, by processing of reflected signals, of the movement of both labelled and unlabelled objects within the field of the transmitter antenna. Modulation with such an envelope also allows a significant increase in peak transmitter output power, while maintaining average output power within limits set by radio licensing and health requirements. This increase in output power allows the dc voltage required to operate the label circuits to be developed at significantly greater interrogation range, or with labels in unfavourable interrogation situations such as implanted within tissue. Since data rates at which rf backscatter labels reply are normally much greater than achieved with low frequency transponders, interrogation pulses can be made sufficiently short and hence interrogations sufficiently frequent to enable data retrieval from even rapidly moving objects.

The reply signal which is received from the label via the interrogator antenna 3 is separated from the transmitted signal by signal sampling directional coupler 40, and conveyed via the main line of a signal injection coupler (SIC) 42, to a power splitter (PWS) 43, wherein it is divided into two paths and reticulated to the signal ports of doubly balanced mixers (DBM) 44 and 45. The local oscillator ports of those mixers are fed from transmitter master oscillator 36 via power splitter 46, with one of the signals emergent from splitter 46 being subject to a ninety degree phase shift in quadrature phase shifter (QPS) 47. Outputs IBS and QBS of balanced mixers 44 and 45 therefore represent in-phase and quadrature components of the signal received by the interrogator, translated downward by an amount equal to the interrogation frequency. The outputs IBS and QBS of signal mixers 44, 45 are fed to base band processor and decoder (BPD) 48, from which the decoded reply is determined by means to be explained later.

The function of double stub tuner 41 can now be explained. Its principal purpose is to prevent overload of signal ports of balanced mixers 44 and 45 from occurring either through imperfect matching of interrogator antenna 3 to its transmission line, or through imperfect directivity in signal splitting coupler 40. Appropriate adjustments of tuner screws can produce reflections which can cancel unwanted coupling which can arise from either of the mechanisms just mentioned between transmitter power amplifier 39 and receiver mixers 44 and 45, with the result that quite high transmitter powers can be used before those mixers become overloaded.

Such adjustment, which is normally manually performed during assembly and test of the interrogator, using observation of the waveform present at the outputs QBS and IBS of mixers 44 and 45 respectively as the adjustment criterion, is of considerable benefit in enhancing receiver sensitivity, but cannot remain fully effective in the face of variations in antenna reflection factor which occur as a result of objects moving in the field of interrogator antenna 3. Significant improvement in interrogation sensitivity may be achieved in the face of such variation if cancellation of unwanted coupling is made self adjusting, as it may be so made in a manner to be described below. The system to be described below can also cancel, within amplitude limits, effects of imperfect directivity or changes in directivity of signal splitting coupler 40, such as may occur for example through temperature changes within that device.

For this purpose, an auxiliary coupling channel is established in which a portion of transmitter power is sampled by means of a further port of signal splitting coupler 40, and fed to power splitter (PWS) 49. The two equal amplitude outputs of power splitter 49 are recombined in power combiner (PWC) 50 after each has experienced some attenuation in one of the voltage controlled attenuators (VCA) 51 or 52, and one of them has been subject to a ninety degree phase shift in quadrature phase shifter (QPS) 53. The output of power combiner 50 is reinserted into the reply signal chain by means of previously mentioned signal injection coupler 42.

The effect of the system just discussed is that means are provided to cancel, within amplitude limits, a residual transmitter antenna mismatch, and the effect of any other stray coupling path between transmitter and receiver, both of any phase.

So that this reflection can be automatically adjusted, the control signals for the voltage controlled attenuators are derived by means of an adaptive control block (ACB) 54, which takes its inputs from the in-phase and quadrature reply signal mixers 44 and 45, and from the signal controlling the transmitter envelope generator 38, and determines within each interrogation cycle the voltages required to be fed to control ports of voltage controlled attenuators 51 and 52.

The selection of the output signals from the receiver mixers 44 and 45 as input signals for the adaptive control block, the use of an auxiliary TEC signal from the transmitter, and the use of a continuous wave local oscillator input to the balanced mixers offers the advantage that the level of input signal at the interrogation frequency to the rf port of the mixers may easily be determined even in the face of imperfect isolation between the local oscillator and output ports of the said mixers.

The dual objectives in the introduction of the auxiliary coupling channel are the continuous minimisation, as objects move in the field of the interrogator antenna, in the amount of power at the transmitter carrier frequency which reaches the inputs of the receiver mixers 44 and 45, so that their overload may be avoided, and also the continuous minimisation, as objects move in the field of the interrogator antenna, in the amount of transmitter generated noise, at the sideband frequencies employed by the reply signal, which reaches the said receiver mixers, which while not overloading them does compete with the weak reply signal which the receiver is intended to detect.

So that these dual objectives may simultaneously be achieved by a single set of adjustments, it is intended that amplitude and phase characteristics of the auxiliary coupling channel should match those of the unwanted coupling provided by: the imperfections in the signal separator; antenna matching; unwanted coupling between separate transmitter and receiver antennas; or environmental reflections back into a single interrogator antenna.

A desirable way in which this matching may be obtained is by the use of broad band components for the antennas and signal separator, and for the components of the auxiliary coupling channel.

Figure 10:
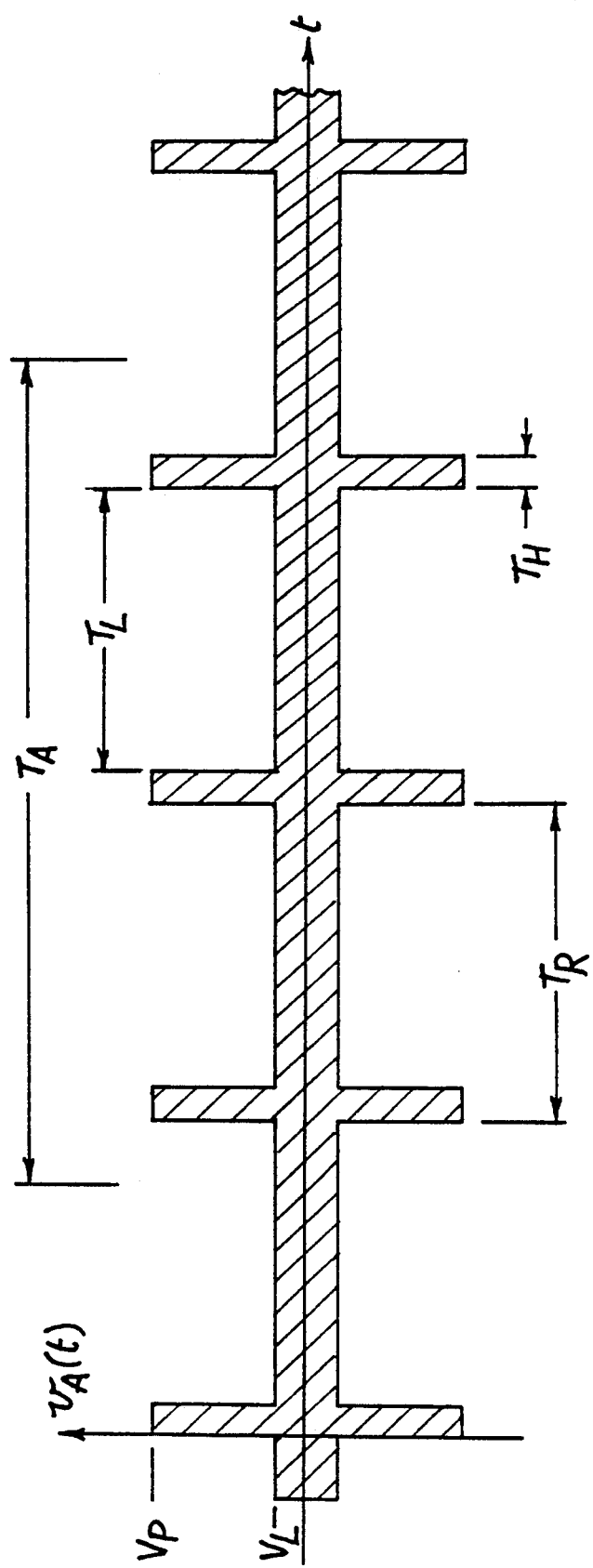
FIG. 10 shows the variation with time of the envelope of the interrogation signal provided by the interrogator.

FIG. 10 shows in a preferred embodiment the parameters of the modulation envelope of the transmitter signal. In this envelope, the transmitter signal at the interrogator antenna is maintained at a high level $V_H$ for a period $T_H$, and at a lower level $V_L$ for a period $T_L$, the total of these periods forming an interrogation repetition interval $T_R$. The interval $T_A$ is an averaging period, related to statutory regulations limiting average interrogator power, and is discussed in more detail later.

In the case when monitoring of object movement between interrogations is not required, the level $V_L$ may be set to zero. In one case when objects move slowly through the field of the interrogator, the interrogation cycle may be repeated at regular intervals $T_R$. In another case when it is sensed, possibly during the low power period, that an object may be moving quickly through the field of the interrogator, the intervals between high-power periods may temporarily shortened to present to such rapidly moving object several high power periods, provided the said repetition intervals are later lengthened to achieve the required average power over the statutory interval $T_A$. In yet another case the intervals between high power periods can, subject to the requirement of not exceeding the allowed average power over the statutory interval $T_A$, be made dependent on the time taken for decoding, so that interrogations may be made with the greatest practicable frequency.

In the design of this modulation envelope, several complex matters must be considered and some conflicting requirements met. In the first place the high level of the interrogation signal should be long enough to allow coherent operation of any on-board oscillator within the label over the full period required for the generation of a label reply. Such coherence allows demodulation schemes with low effective noise bandwidth to be constructed within the interrogator for the label reply.

Figure 11:
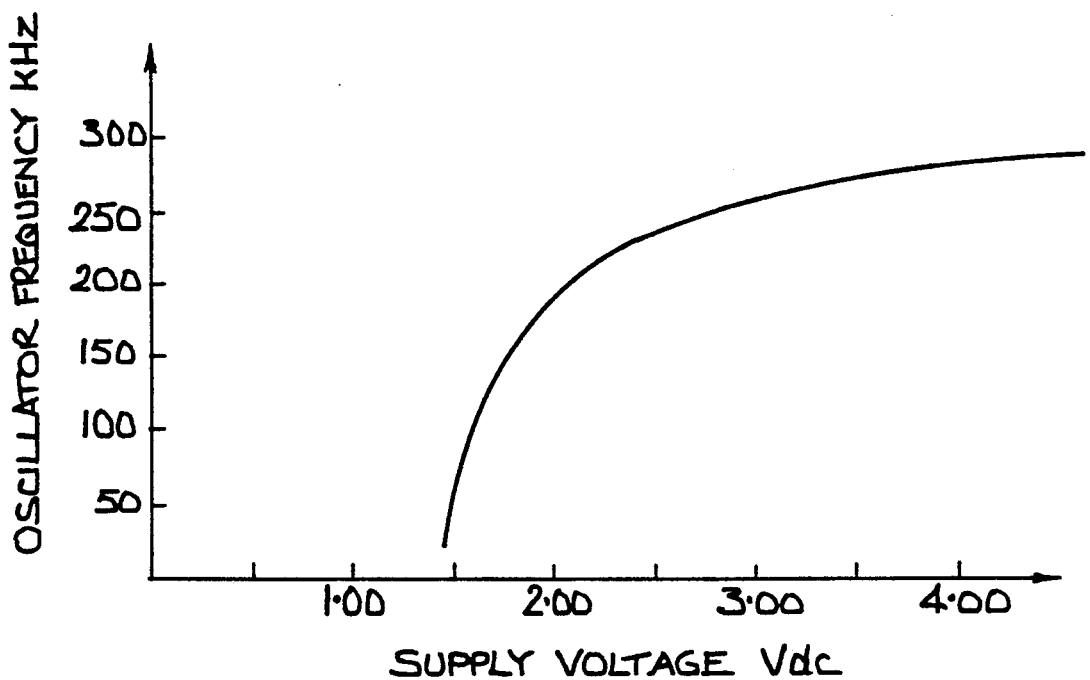
FIG. 11 shows a typical variation of the frequency of the oscillator within the label with its supply voltage.

Under this requirement the time period for which high level transmission must take place is a function of interrogation signal strength reaching the label, because in an economically manufacturable label the frequency of an oscillator circuit placed within the label for the purpose of control of timings in the reply generation process is dependent in a complex and non-linear way upon the strength of that signal. A typical dependence of the on-chip oscillator frequency upon rectifier output voltage measured by the inventors is shown in FIG. 11.

In the second place the peak power which can be transmitted is regulated by many factors. These include: the average power which is allowed to be transmitted by a regulating body over a time period found within the regulations and shown as $T_A$ in FIG. 10; the ratio of peak power to average power which is allowed within the regulations; and the number of interrogations desired per second, which is dependent upon the application. It is a consequence of these complex dependencies, and the dependence of oscillator frequency upon signal level and the need for coherent operation over at least one complete reply, both discussed in the preceding paragraph, that the maximum interrogation range is a complex and non-linear function of the width of the high power section of the interrogation signal envelope. The inventors have calculated that for a minimum interrogation rate of ten interrogations per second, a sixty-four bit reply code employing binary phase shift keying of a sub carrier signal with four sub carrier cycles per information bit, a dependence of oscillator frequency upon interrogation signal as shown in FIG. 11, and a requirement for coherent detection of two consecutive replies within the high-power section of the interrogation signal envelope, that the dependence of interrogator range upon transmitter high power period $T_H$ is as shown in FIG. 12.

An additional constraint arises from the dependence of relevant receiver noise level in the interrogator upon the frequency of oscillation of the oscillator within the label. This constraint arises because the position of the reply frequency in relation to the interrogation signal frequency is controlled by the label oscillator, and in the homodyne receiver generally used for the receipt of such replies the amount of transmitter phase noise per unit band width generated by the transmitter is dependant upon the frequency separation between the receiver pass band and the interrogation signal.

Figure 12:
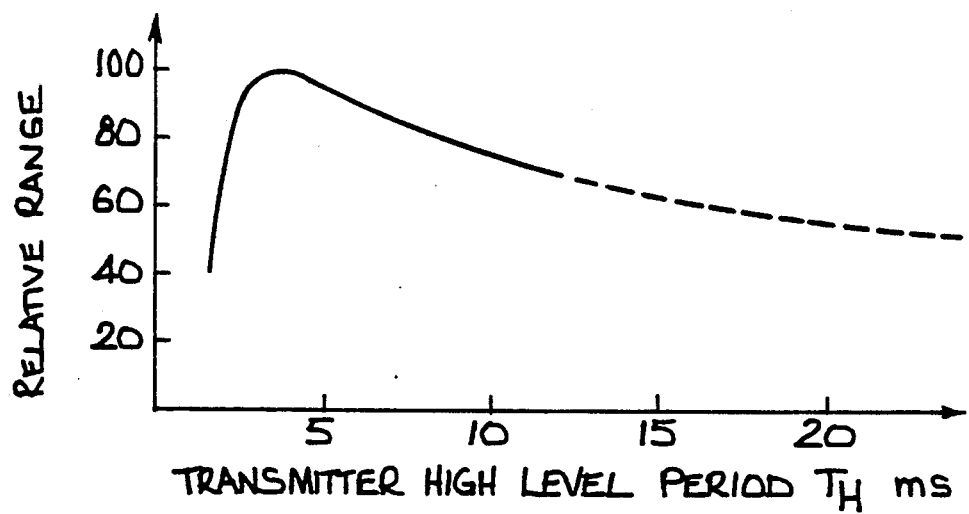
FIG. 12 shows in a practical label and interrogator system the variation of interrogation range with a parameter of the interrogation signal envelope.

The result of this constraint is that at the longer interrogator high-level periods shown in FIG. 12, although the required number of coherent replies can be received by the interrogator, those replies are at an unsatisfactory signal to noise ratio in the receiver, and the interrogation range implied by this portion of the curve in FIG. 12 cannot be achieved. This portion of the curve has therefore been shown as dotted in FIG. 12, and is not used in design.

The achievement of maximum range for the interrogator depends upon the optimum adjustment of the modulation envelope of the transmitter signal in respect of all of the factors mentioned. In the preferred embodiment described, the optimum range is obtained with the high-level period set at the value which produces the peak shown in FIG. 12.

Figure 13:
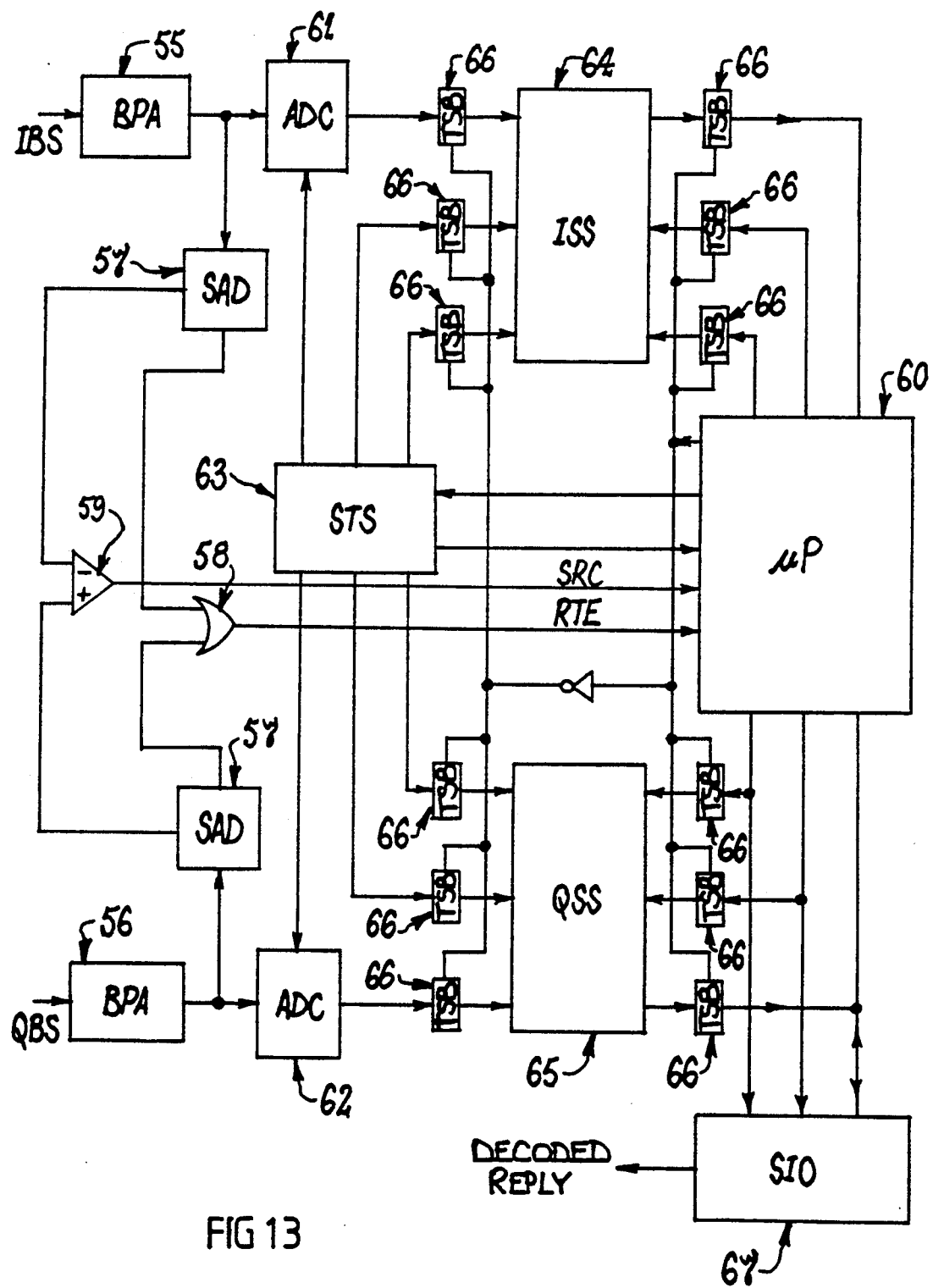
FIG. 13 shows the structure of one form of base band signal processor of an interrogator.

FIG. 13 shows a block diagram of one preferred embodiment of base band processor and decoder 48. In this embodiment base band signals IBS and QBS from receiver mixers 44 and 45 are first amplified in band pass amplifiers (BPA) 55 and 56, with amplitudes of the signals being detected in signal amplitude detectors (SAD) 57. These devices may produce an analog output dependent on reply signal strength at their input, and a digital output indicating whether the reply signal strength at their input has exceeded a threshold set to indicate that a reply is being received. The digital outputs of signal amplitude detectors 57 are combined in OR gate 58, the resulting reply threshold exceeded signal RTE being fed to micro processor (uP) 60 which controls operations within the base band processor decoder. The analog outputs of signal amplitude detectors 57 are compared in amplitude comparator 59, the resulting strong reply channel signal SRC being also fed to microprocessor (uP) 60.

When the occurrence of a reply is so detected, a digital record of the reply signal in both in-phase and quadrature channels is made and is stored within the memory of micro processor 60. The digital representation of the reply is prepared by fast analog to digital converters (ADC) 61 and 62, operating under control of sampling timing system (STS) 63, which generates when required the sequence of memory address and control signals required to place regularly obtained digital samples of band pass amplifier 55, 56 outputs into memory blocks (ISS) 64 and (QSS) 65. A series of tri-state buffers (TSB) 66 allow the same memory blocks to be placed when required directly within micro processor 60 address space.

Decoding operations performed within this base band processor and decoder are performed by software, within micro processor 60, in the time intervals between interrogation pulses, after each record of the reply has been completed. Advantages of performing decoding in this way are that complex signal recovery from noise algorithms may be used; that decoding can deal with signals of large fractional bandwidth; that irregularities in the reply may be flexibly detected and discounted; and that no part of the reply is lost in initial synchronisation between the reply signal and real time decoding circuits which may have been used as an alternative.

This post-interrogation decoding of a record of the reply wave form also allows an adaptive examination of the wave form for evidence of forms of modulation other than those intended in a properly tuned label, with decoding being based on those alternative forms of modulation, so that labels which have been detuned through being in unusual environments may still be successfully decoded.

Further advantages of performing this post-interrogation decoding of a record of the reply wave form between interrogation pulses is that decoding algorithms for which the execution time is considerably greater than the time for the high power period of the interrogation signal can be used without any significant impact on the rate at which information is available from the interrogator.

A further advantage of the non-real-time decoding of a reply record is that it enables the use of labels of simple design and low manufacturing cost in which no effort is made to ensure a particular initial condition for the cyclic counters which control the selection from reply memory within the label of bits fed to the modulator. If such labels cyclically repeat their reply as long as they are illuminated by the interrogator, and they contain within the reply a code word indicating the start of message, and the high power period of the interrogation signal is made long enough for at least one complete reply to be generated, and a digital record of the reply is made in the interrogator, then the entire reply can be decoded irrespective of the position within the reply record of the start of the reply message.

In the reply signal decoding such measures as: digital filtering with either fixed or adaptive parameters; examination of time positions of zero crossings; examination of the variation in amplitude between samples; creation of tables of waveform descriptors; the use of those tables to find within the reply record the interval between bits of the reply, the values of the individual bits and the start of the message; may be employed. An advantage of performing all these operations upon a reply record is that they may be adjusted adaptively and recursively either over the whole reply or sections thereof to allow for variations, either between replies or within a reply, in the frequency of any oscillator controlling timing operations within a label, so that successful decoding of only a single isolated reply is obtained.

In a preferred embodiment, the decoding process is applied first to the samples taken from the channel reported by signal SRC as having the strongest reply. Band pass digital filtering may be applied by replacing each sample value by the average of itself, the two preceding and the two succeeding samples.

In the preferred embodiment which employs in the label differential binary phase shift keying of a sub carrier with, in the absence of a phase change, four cycles per reply bit, a table of half-cycle intervals is then constructed by counting the number of consecutive samples for which the sign of the sample is either positive or negative.

In the examination of this table by the program within the micro processor 60 which then occurs, a moving estimate of reply sub-carrier half-cycle length is kept by forming the average of the lengths of the currently examined half cycle and the preceding three half-cycles. A phase change is considered to occur when the sum of the length of the currently examined half cycle and the preceding half-cycle exceeds 2.5 times the moving average.

The start of message is detected when a phase change is detected after at least 64 half-cycles of constant phase. Bit intervals are then assigned to cover either eight half-cycles of constant phase of seven half-cycles where a phase change has been detected.

A binary zero is then assigned to any bit interval which follows a phase change, and a binary one is assigned to any bit interval which does not. After 48 bits including the start of message have been decoded, it is confirmed that every eighth bit after the zero which starts the message is a zero, and the six zeros so identified are removed from the 48 to form a 42 bit data stream. Of these 42 bits the final 16 are confirmed as containing a 16 bit cyclic redundancy check over themselves and the preceding 26. The eight bits which follow the 48 just discussed are decoded as containing a three-bit error detecting, single-bit error correcting code, and four of them are added to the 26 previously decoded bits to produce a final decoded data stream of 30 bits.

An advantage of this form of algorithmic and adaptive decoding is that it can produce success even with large changes during the generation of a reply in the within-label oscillator frequency which may occur as the label moves from strong to weak parts of the interrogation field, these changes being too large for the normally used hardware phase-locked loop decoding techniques to be successful.

An advantage of this form of label information encoding and interrogator decoding is that the majority of information bits may in the manufacturing process of labels be encoded by the very robust process of mask level programming, and be subject to the very robust error detection process of a 16-bit cyclic redundancy check, these features leading to reliable operation of labels at long range. To allow efficient re-use of the integrated circuit manufacturing masks, eight of the bits of the complete reply code are made externally programmable so that a single mask, providing approximately 2,000 differently coded labels, may be used potentially 256 times to produce up to approximately 512,000 differently coded labels. Because in such use eight of the reply bits would carry no error checking, the eight externally coded bits are programmed to contain four independent bits and four dependent bits, so as to implement the previously mentioned and robust three-bit error detecting single-bit error correcting code.

If the decoding of the strongest reply is successful under the algorithm just described, the result of the decoding is reported by the microprocessor. If the result is not successful, the same procedure is applied to the data recorded for the channel containing the weaker reply, and if successful decoding is obtained, the result is reported. If however the result is again unsuccessful, an alternative decoding algorithm in which a search for a frequency modulated reply is implemented.

In this alternative algorithm, a moving estimate of sub carrier frequency over eight half-cycles is obtained by counting the number of sample points in each half cycle and the preceding seven. A frequency change is considered to occur when a significant maximum in this value is followed by a significantly different minimum. Bit intervals are assigned so that maxima and minima occur close to the centre of such intervals and the number of half cycles in each interval is seven or eight. A binary one is assigned to the longest sequence without frequency change, and after each frequency change the assigned binary number is the complement of the number preceding the change. The remaining checks for start of message, fixed zeros, cyclic redundancy check, and three-bit error detecting single-bit error correcting check are as already described for the phase shift keying decoding algorithm.

An evident advantage of having decoding based on a record of the reply wave form is that it facilitates the implementation of complex error detection or error correction procedures which may be based upon check bits placed in the reply, so that the reply may be either passed as valid, or corrected and passed as valid, before being reported.

An advantage of separate decoding of the records of the in-phase and quadrature channels is that the distortion or loss of phase information which occurs when the standard methods of combining in-phase and quadrature channels are used is avoided, as neither of these distortions are present if the channels are kept separate.

Figure 14:
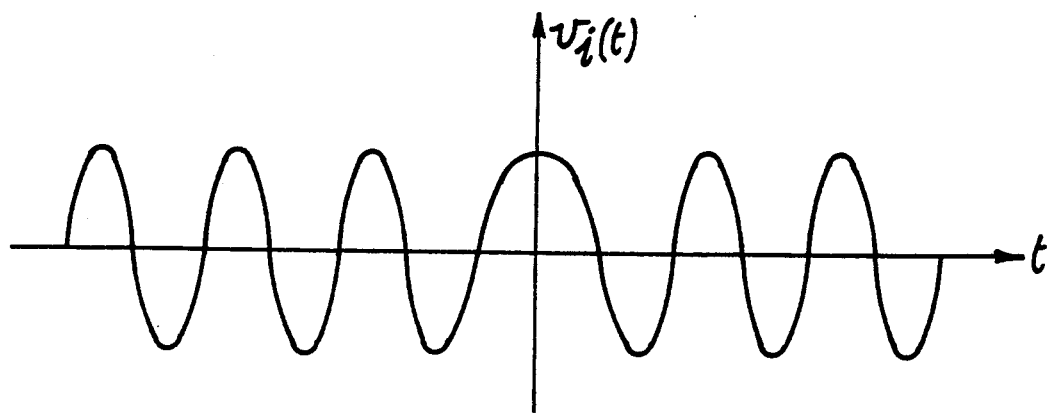
FIG. 14 shows waveforms produced by various forms of reply signal processing.
Figure 14:
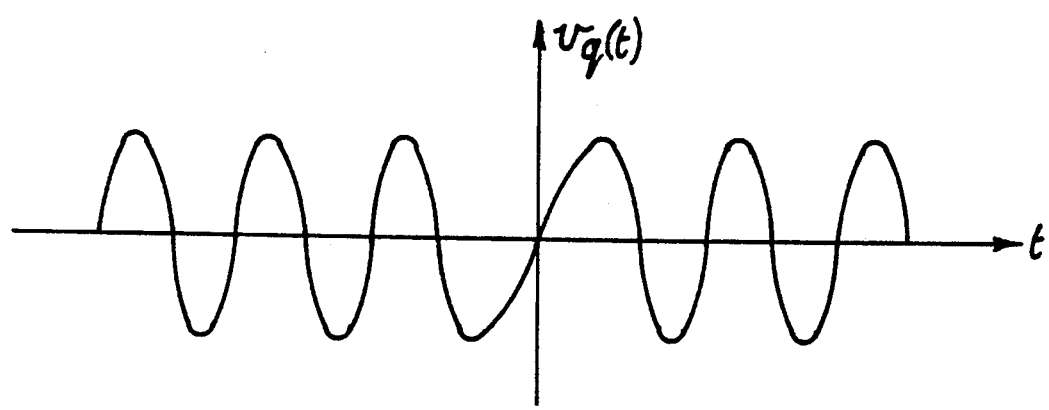

An illustration of the form of distortion referred to is given in FIG. 14. The upper waveform shows the appearance of the IBS base band signal presented to the decoder when a binary phase shift keying modulation is applied to a sub carrier within a label. In the interrogator illustrated in FIGS. 9 and 13, the QBS signal would have the same appearance, and the phase shift is readily detected by algorithms of the type described earlier. Of course in a homodyne receiver, one or other of these signals may have insufficient amplitude for reliable detection, and an appropriate response to the problem is required.

The standard response is to combine the IBS and QBS signals after the latter has been subject to a further phase shift of 90 degrees. This processing however produces in practice for approximately half of the possible label positions the distorted waveform shown lower in FIG. 14, which is the Hilbert transform of the waveform in the upper half of the Figure, with the result that decoding by algorithms as described above is less reliable, particularly when, as is desirable from the point of view of speed of information transmission, only a small number of sub-carrier cycles is provided for each reply bit. This problem is completely avoided in the interrogator architecture defined in FIGS. 9 and 13.

A further advantage of the independent decoding of in-phase and quadrature channels is that the results of the decoding of each channel may compared before a result from either is reported. Such comparison can be based, for example, on: the strength of reply in each channel; the quality of the reply wave forms, i.e. the extent to which the reply waveforms conform in shape to those expected, for example being uniform in amplitude and varying smoothly in phase; an estimate of noise accompanying the waveforms; or the values of any error detection bits which may have been inserted into the reply code. The result reported, if any, can be based upon the results of such comparison.

There is a still further advantage of the independent decoding of in-phase and quadrature reply channels with reporting only after a successful decode is made. It is frequently the case that labels which are optimised for long interrogation range will have, in the reply signal generation process, their narrow-band interrogation signal level dependent internal resonant circuits operating between two quite unpredictable points on their resonance curves. The reply signal which is then produced can best be described as arising from simultaneous non-linear amplitude and non-linear angle modulation of the original interrogation signal. The inventors have shown that the forms of reply signal which may result will always produce a detectable signal in at least one of the in-phase or quadrature channels of the interrogator described in FIG. 9, but that if those channels are combined after one has been subject to a phase shift of 90 degrees, there are, for some of the forms of modulation, positions of labels for which the net base band signal so derived is extinguished, and the standard form of interrogator employing the technique of in-phase and quadrature channel re-combination will not detect labels in this situation.

A still further advantage of the independent decoding of records of the reply wave form in the in-phase and quadrature channels is that the decoding of the two channels can be performed sequentially, with attention being concentrated upon the channel which is most likely to produce a correct result from the decoding process in the time available between collection of replies in a system employing a shaped interrogation signal envelope as defined in FIG. 10. The selection of the channel to be decoded initially could be based on the relative strengths of reply in the two records, while the decoding process can include an hierarchy of checks so that decoding of one channel may be abandoned as soon as it becomes clear that an incorrect result will be obtained, with attention then being transformed to the other channel.

The reply signal when once correctly decoded is available via serial interface (SIO) 67 of microprocessor 60.

Figure 15:
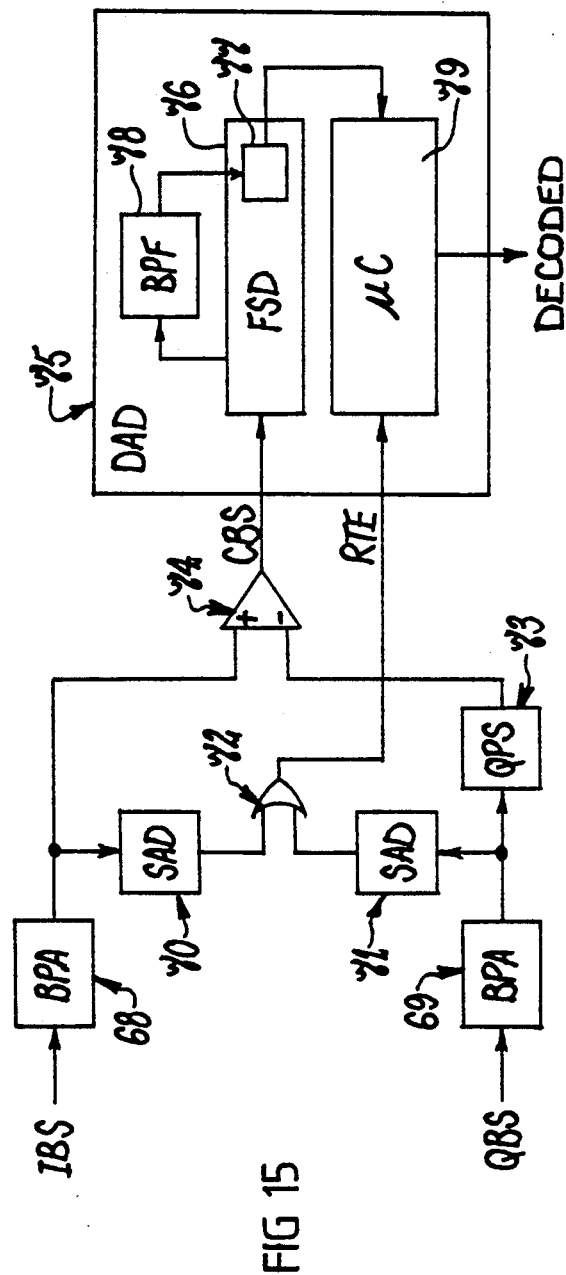
FIG. 15 shows the structure of a second form of base band signal processor of an interrogator, and the structure of a demodulator and decoder for a frequency shift keying encoded reply.

FIG. 15 shows a block diagram of another preferred embodiment of base band processor and decoder 48. As in FIG. 13, this circuit provides band pass amplifiers (BPA) 68 and 69 for outputs IBS and QBS from receiver mixers 44 and 45. For the amplified base band signals, threshold signal amplitude detectors (SAD) 70 and 71, the outputs of which are combined in OR gate 72 to produce reply threshold exceeded signal RTE, are again provided.

The remainder of the processing however differs considerably from that described in relation to FIG. 13. In the present embodiment the reply signal generation scheme used in the labels is assumed to produce a reply signal modulation superimposed on a sub carrier, and amplified mixer output signals are assumed to be of small fractional bandwidth. These signals are combined, after amplification and after the quadrature signal has been subject to a further ninety degree phase shift in quadrature phase shifter (QPS) 73, in difference amplifier 74. The composite base band signal CBS produced by difference amplifier 74 is fed together with the RTE signal to demodulator and decoder (DAD) block 75.

The contents of demodulator and decoder block 75 depend on the form of modulation employed within the label to provide an expression of the reply code. The present example shows the components which will accomplish real time demodulation and decoding of signals encoded by frequency shift keying. These components consist simply of a standard frequency shift keying decoder circuit (FSD) 76, such as the EXAR XR2211 incorporating a zero crossing detector 77, and operating in conjunction with a band pass or low pass filter 78 and simple micro controller (uC) 79, such as a Motorola MC68HC11.

In operation of this circuit, FSK decoder 76 produces at its first output a waveform proportional to reply modulation frequency. This waveform is subject to band pass or low pass filtering in filter 78 and the filter output is applied to zero crossing detector 77, which produces the second output of decoder 76.

Micro controller 79 recognises transitions in voltage level of the waveform produced by detector 77, and decodes the serial bit stream so found. The decoded reply resides in micro controller memory, and emerges when called for, from the serial port of that device.

An advantage of use of frequency shift keying in the label, and a phase locked loop frequency shift decoder in the interrogator, is that they together provide a very compact decoding process for reply modulation. The reply signal frequency is by this means readily converted to an equivalent voltage as the phase locked loop simply tracks variations in label oscillator frequency, even when that frequency varies over a significant range due to variations in label rf excitation level and hence rectified dc supply voltage.

The advantage of use of band pass filtering in the demodulation process just discussed is that slow variations in label oscillator frequency caused by variation in dc voltage developed in the label rectifier circuit as the label moves within the interrogation field will not cause error in interpretation of information content of the reply.

Although FIG. 15 shows as contents of the demodulator and decoder block, components which are appropriate to an FSK modulation produced in the label, other simple contents can be used for other forms of modulation.

Figure 16:
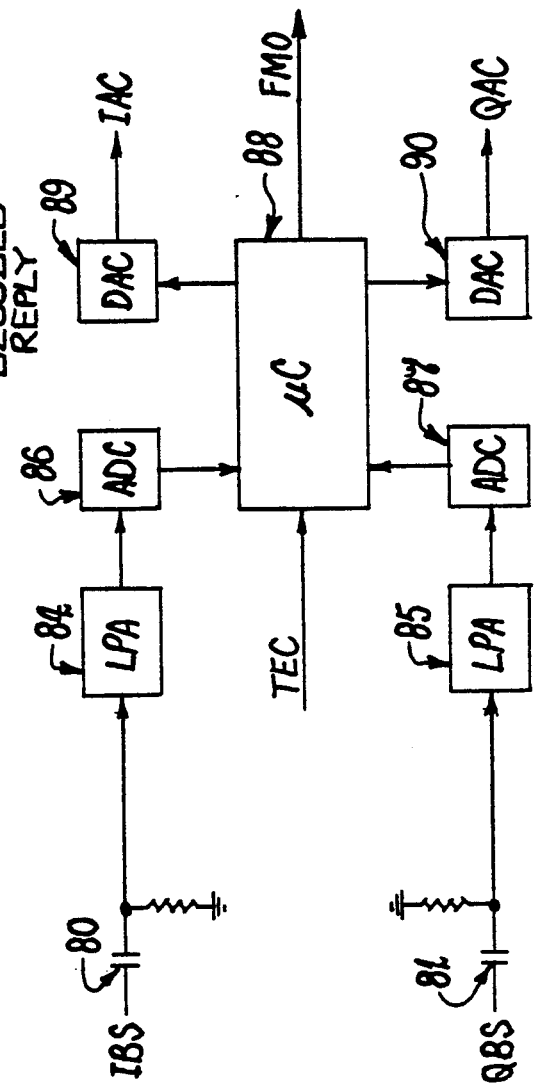
FIG. 16 shows the structure of an adaptive control block used in a reflection cancellation system of an interrogator and in detection of object motion.

FIG. 16 shows details of one embodiment of adaptive control block 54 of the interrogator. The input signals are the TEC signal from the base band processor and decoder, and the base band signals IBS and QBS from receiver mixers (DBM) 44 and 45. The latter signals are by capacitors 80 and 81 stripped of their dc component, which can arise from interaction of local oscillator excitation and imperfect balance of the mixers, and are fed via low pass amplifiers (LPA) 84 and 85, to analog to digital converters (ADC) 86 and 87. These converters are used to generate, during the transmitter high power period and the transmitter low power period, digital representations of the mixer outputs separate to those periods and to the two channels. These representations, and the TEC signal, are available to micro controller (uC) 88.

During the period of the low power interrogator transmissions, micro controller 88 examines the signals produced by converters 86 and 87 for evidence of medium frequency components such as occur by Doppler shift when objects move rapidly within the field of the interrogator. If such signals are found the micro controller 88 provides as shown in FIGS. 9 and 16 a fast moving object signal (FMO) to the base band processor and decoder 48. In response to this signal, the interrogator controller within the base band processor and controller 48 may temporarily modify the transmitter envelope control signal TEC to achieve, for a short period of time, a greater than normal frequency of occurrence of transmitter high level periods, so as to ensure that at least one reply is received from the fast moving object.

During the period of the high interrogator power transmissions, micro controller 88 makes observations of the correlation between the TEC signal and the changes in the IBS and QBS signals which may occur in response to imperfect elimination of transmitter signals reaching the receiver. During the period between high power transmissions, micro controller 88 makes a calculation of the adjustment in control signals to the voltage controlled attenuators (VCA) 51 and 52 in the receiver required for improvement in cancellation of unwanted transmitter signals, and generates fresh values of those control signals by means of digital to analog converters (DAC) 89 and 90, for presentation to attenuators 51 and 52 before the next high interrogator power transmission period. The advantage of performing these operations is that maximum interrogator sensitivity is maintained at all times.

Figure 17:
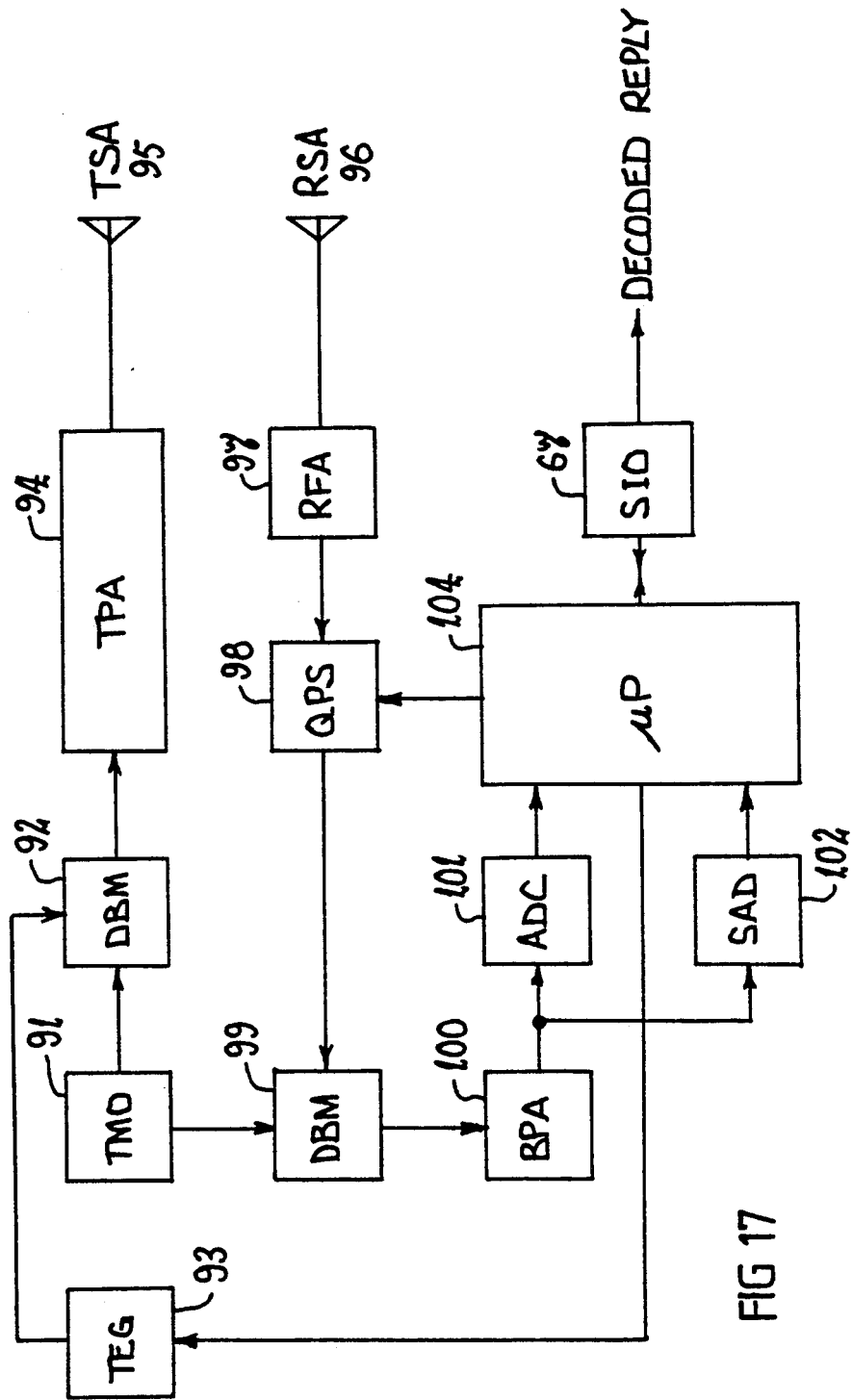
FIG. 17 is a block diagram of another form of interrogator.

FIG. 17 provides a block diagram of another preferred embodiment of interrogator. In this embodiment interrogation signals again originate in transmitter master oscillator (TMO) 91 the output of which is amplitude modulated in doubly balanced mixer (DBM) 92 which receives the modulation signal from the transmitter envelope generator (TEG) 93. The amplitude modulated transmitter signal emerging from doubly balanced mixer 92 is amplified in transmitter power amplifier (TPA) 94 and is radiated by transmitted signal antenna (TSA) 95. The reply signal from the label which is received by independent reply signal antenna (RSA) 96 is amplified in radio frequency amplifier (RFA) 97 and passes through quad phase switch (QPS) 98 before being passed to receiver double balanced mixer (DBM) 99. That mixer receives a local oscillator signal from the transmitter master oscillator 91 so that the reply signal is converted to a base band frequency at its output. The down converted reply signal which emerges from receiver mixer 99 is passed to band pass amplifier (BPA) 100 the output of which is conveyed to both receiver analog to digital converter (ADC) 101 and receiver signal amplitude detector (SAD) 102. The output of both of these devices are conveyed to microprocessor system (uP) 104 which generates as one of its outputs a control signal for quad phase shifter 98.

The microprocessor is responsible for the initiation of interrogations and the control of their high and low intervals through control signal TEC sent to the transmitter envelope generator 93. The microprocessor also monitors the output of the signal amplitude detector 102 to determine whether within the transmitter high-power period an above-threshold label reply is received. The microprocessor may also monitor in more detail the signal emerging from the band pass amplifier 100 by examining the outputs of the analog to digital converter 101.

When reply signals are received, decoding operations within the microprocessor 104 are similar to those described earlier in relation to FIGS. 9 and 13. In this embodiment however there is the additional operation that at the conclusion of each decoding operation an examination of the amplitude of the reply signal and of the success of the decoding is made. If the decoding has been unsuccessful, or the amplitude of the reply is below expectation, the digital control signal to the quad phase shifter 98 is complemented so that a 90 degree phase shift is either added to or removed from the reply signal path.

The advantage of this design of interrogator is that when labels are positioned so as to produce for one setting of the quad phase shifter 98 a reply signal to the receiver mixer 99 which is almost in quadrature with the local oscillator received by that mixer, so that its output is too low for successful decoding, the next interrogation cycle will be conducted with the reply signal and the local oscillator signal to the mixer 99 almost in phase. The result is that when more than one interrogation can be performed before the label is significantly moved, positions at which the reply signal from the label is not detected do not occur. It is clear that in an alternative embodiment the quadrature phase shifter may be placed between the transmitter master oscillator 91 and the double balanced mixer 99.

An advantage of this embodiment over the embodiment illustrated in FIG. 9 is that the provision of only one reply channel decreases the cost and size of the interrogator, without prejudice to its performance when labels remain for a considerable period within the interrogation field. A further advantage is that the use of separate transmitter signal and reply signal antennas makes it easier to achieve the high degree of isolation between the transmitter and receiver systems desirable in the interrogation of backscatter tags.

Figure 18:
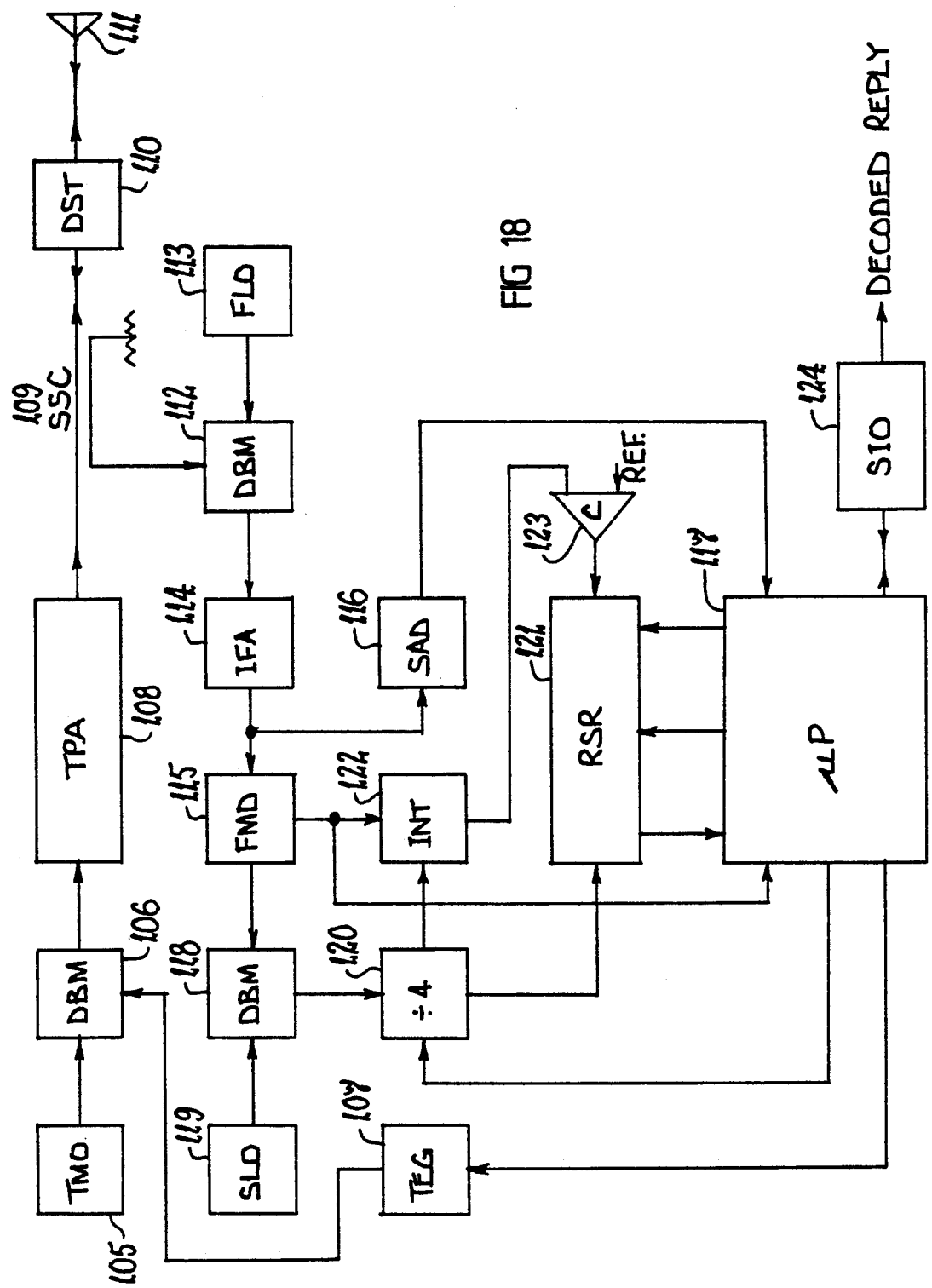
FIG. 18 is a block diagram of a still further form of interrogator.

A block diagram of yet another preferred embodiment of an interrogator is provided in FIG. 18. With this interrogator the process of generation of an interrogation signal parallels that already described in relation to FIG. 9, and uses similarly labelled functional blocks. In this embodiment the preferred frequency for the interrogation signal is 27 MHz.

In the receiver section of the interrogator, however, operations are significantly different. The reply signal which is received by interrogator antenna 111 is passed through double stub tuner (DST) 110 and signal separation coupler (SSC) 109 to a first receiver double balanced mixer (DBM) 112. The local oscillator signal for that mixer is supplied by receiver first local oscillator (FLO) 113 operating in this embodiment at 16.625 MHz. In the labels for which this interrogator is intended, the reply signal is encoded by the method of frequency shift keying of a reply sub carrier, with four sub carrier cycles per reply bit, a binary one being represented by a sub carrier of frequency approximately 400 kHz and a binary zero being represented by a sub carrier frequency of approximately 250 kHz, that modulated sub-carrier being used to amplitude modulate the interrogation signal to create upper and lower sidebands. In a practical situation the sub carrier frequencies can be subject to manufacturing tolerances and also to variations as the label moves between regions of strong and weak interrogation field strength.

The reply signal in the preferred embodiment of label for which this interrogator is intended may consist of 64 information carrying bits preceded by a 16 bit flag, within which for the first 15 bits the upper of the two sub carrier frequencies is maintained, while for the 16th bit the lower of the two carrier frequencies is employed.

The output signal from the first receiver mixer 112 is passed to intermediate frequency amplifier (IFA) 114, centred on 10.7 MHz and with a bandwidth of 200 kHz, which selects and amplifies only the upper of the two interrogation frequency side bands present in the down-converted reply. An advantage of this single sideband method of reply detection is that replies are sensed at all label positions.

The output signal from the intermediate frequency amplifier 114 is passed both to frequency modulation detector (FMD) 115 and to signal amplitude detector (SAD) 116. The function of the signal amplitude detector 116 is generally as described previously, that is to indicate to the microprocessor (uP) 117 controlling the interrogator that a label reply is being received.

The frequency modulation detector 115, which can be a standard component such as Signetics NE 564, produces two outputs, the first being a digital output giving an indication of whether the upper or lower of the two expected reply frequencies is being received, while the other signal is the output of a voltage controlled oscillator internal to the detector 115. This signal is used in the frequency discrimination process of the detector 115, and tracks the input frequency currently being fed to its input.

That voltage controlled oscillator output, which will in the present embodiment be at one of the two frequencies 10.775 MHz or 10.625 MHz, is fed to second receiver double balanced mixer (DBM) 118, the local oscillator input to which is provided by receiver second local oscillator (SLO) 119, operating in this embodiment at a frequency of 10.375 MHz. The difference frequency output from the second receiver mixer 118 will therefore be at the frequency of the reply sub carrier generated within the label. The output from the second receiver mixer 118 is passed to divide-by-four counter 120, the operation of which is initialised by the micro processor 117, and the output of which is used to provide a clock signal to a receiver shift register (RSR) 121. The output of the divide-by-four counter 120 is also used to initiate an analog integration operation in integrator (INT) 122, which takes as its input a digital signal from the frequency modulation detector 115 indicating whether the upper or lower of the reply signal frequencies is being received.

The output of the integrator is fed to comparator (C) 123 which is also supplied with a reference level half way between the upper and lower values obtained from the integrator 122 for the two possible values of its input. The digital signal level output of the comparator 123 is provided as a serial digital data input to the receiver shift register 121.

The sequence of operations within this interrogator is as follows. When a reply signal is received from a label, the signal amplitude detector 116 alerts the micro processor 117 during the flag period of that reply. The micro processor 117 then examines the digital output from the frequency modulation detector 115, and looks for a high to low transition which occurs after that output has remained high for at least twelve reply bit periods. When this event is detected, the micro processor 117 allows the divide-by-four counter 120 to operate, so that at the end of each four cycles of the recovered reply sub carrier, a digital representation of whether that sub carrier was at the higher or lower of its two frequencies is shifted into the reply shift register 121.

The advantage of inclusion of the integrator 122 in the processing is that in the estimates of the reply bit values which are entered into the reply shift register 121, the effects of delays in the sub carrier signal recovery circuits and of jitter which may occur at low signals in the positions of transitions in the digital output signal from the frequency modulation detector 115 are minimised.

At the conclusion of the reception of 64 bits of reply information, data input to the reply shift register is suspended, and the micro processor gains access to the data in that register. The reply signal so accessed is examined for the presence of any intended permanently programmed bits, and for the correctness of any parity or cyclic redundancy checks. If a correct reply has been obtained, it is provided to external systems via the serial input output interface (SIO) 124.

An advantage of this form of interrogator is that it permits data recovery from reply signals which employ only a limited number of sub carrier cycles per information bit, and in which the time period of each information bit varies considerably both because it is a multiple of the currently employed period of the modulated oscillator within the label, and also because that oscillator can vary considerably in frequency as the tag moves from areas of strong to weak interrogation field. This recovery of reply information, including the detection of bit boundaries, has been accomplished without the use of the commonly employed Manchester encoding of the reply signal, and the consequential limitations of reply data rate which results from the fact that in that encoding system, frequency changes are sometimes required to occur at the rate of two changes per information bit. The result of the use of the method of reply information encoding and recovery described in this embodiment is that the data rate possible through limited bandwidth circuits is enhanced, with the result that longer replies can be received from labels which move rapidly through the field of the interrogator.

It will be appreciated that various alterations, modifications and/or additions may be introduced into the constructions and arrangements of parts previously described without departing from the spirit or ambit of the present invention.

We claim:

1. A signal responding label for an identification and telemetry system, said label comprising: a radio frequency antenna for receiving an interrogation signal at an interrogation frequency; a resonator including an inductance and a capacitance, having a resonant frequency equal to the interrogation frequency and including an impedance connected to said antenna; a reply generator for generating reply signals; a rectifier system including a diode for providing at least part of the power required by said reply generator; and means for varying said impedance in accordance with the reply signal such that a portion of the interrogation signal is scattered by said antenna; the improvement wherein said resonator produces voltage magnification and the capacitance of said resonator comprises substantially the junction capacitance of the diode so as to optimize said magnification.

2. A signal responding label as claimed in claim 1, wherein said resonator has a pass band width which includes the interrogation signal frequency and frequencies of significant components of the reply signal.

3. A signal responding label as claimed in claim 2, wherein the inductance in said resonator is adjusted such that said resonant frequency occurs at a value of junction capacitance of said diode, said value being voltage dependent, which applies at a desired signal level within the label.

4. A signal responding label as claimed in claim 3, wherein the capacitance of the voltage multiplying resonator comprises the junction capacitance of a plurality of diodes within the rectifier.

5. A signal responding label as claimed in claim 3, wherein the radiation impedance of the radio frequency antenna is matched to the dynamic impedance of the voltage magnifying resonator.

6. A signal responding label as claimed in claim 2, wherein said antenna comprises a magnetic loop having self inductance which provides the inductance forming the voltage magnifying resonator.

7. A signal responding label as claimed in claim 2, wherein said means for varying said impedance comprises a transistor in series with a resistor, said transistor and resitor being proportioned to produce an impedance versus voltage characteristic which matches the output impedance versus voltage characteristic of said rectifier system.

8. A signal responding label for an identification and telemetry system, said label comprising: a radio frequency antenna for receiving an interrogation signal at an interrogation frequency; a resonator incorporating a rectifier diode connected to said antenna and having a resonant frequency equal to said interrogation frequency; and a generator for generating reply signals; characterised in that said resonator produces voltage magnification and the capacitance of said resonator comprises substantially the junction capacitance of said diode so as to optimize said magnification.

9. An interrogator for an identification and telemetry system, said interrogator comprising:
an antenna for transmitting an interrogation signal incorporating amplitude modulated radio frequency energy at an interrogation frequency, said radio frequency energy including a modulation waveform having during a first period a first amplitude and during a second period a second and lesser amplitude; means connected to said antenna for generating said interrogation signal; an antenna for receiving from a signal responding label, during said first period, an analog reply signal containing information and forming a complete reply message; means for separating the interrogation and analog reply signals; means for converting said separated analog reply signal to a lower frequency band; and means for processing the separated analog reply signal to extract the label reply information, the improvement wherein the first period is of a length sufficient to receive from the label the complete reply message, and wherein said processing means includes: means for sampling the converted analog reply signal at a rate sufficient to detect significant components thereof; means for further converting the sampled values of the lower frequency band signal to digital form; means for storing the converted sampled values to create a digital record of the analog reply signal received during the first period, said digital record comprising the complete label reply message; and means for decoding the stored sampled values during the second period to extract said label reply information from said record.

10. An interrogator as claimed in claim 9, wherein the decoding means includes digital filtering, examination of the positions of zero crossings and variation in amplitude between samples for creating tables of waveform descriptors, and the use of those tables to find, within the reply record, the reply bit intervals, the values of individual reply bits, and start of message.

11. An interrogator as claimed in claim 10, wherein the waveform of the label reply is repeated cyclically as long as a relatively high power level of the interrogation signal is received by the label, and wherein reply generating means within the label is arranged to insert a unique data word within the reply signal to indicate the start of message, and the decoding means is arranged to detect, from the record of the cyclically repeated reply waveform, the start of message.

12. An interrogator as claimed in claim 11, wherein decoding is performed adaptively so as not to be affected by variations in the label reply signal caused by variations in the frequency of an oscillator circuit within the signal responding label.

13. An interrogator as claimed in claim 12, wherein the decoding means includes a search for evidence of either frequency or angle modulation within the record of reply waveform, with subsequent decoding steps being dependent upon the result of that search.

14. An interrogator for an identification and telemetry system as claimed in claim 9, wherein shaping of the interrogation signal envelope is such as to have zero amplitude during said second period.

15. An interrogator for an identification and telemetry system, said interrogator comprising:
an antenna for transmitting an interrogation signal including radio frequency energy; means for generating said interrogation signal connected to said antenna; an antenna for receiving from a signal responding label an analog reply signal containing information; and means for separating the interrogation and reply signals; the improvement wherein said interrogator includes first means for converting a component of the analog reply signal which is in phase with the interrogation signal to a lower frequency band to create a first low-frequency channel; second means for converting a component of the analog reply signal which is in quadrature with the interrogation signal to a lower frequency band to create a second low-frequency channel; separate means for extracting said information from each of those channels; means for comparing the results of said extraction; and means for choosing between the two extracted results such that one only of them is reported as the result of the interrogation.

16. An interrogator for an identification and telemetry system as claimed in claim 15, including means for detecting, within the reply signals in each of the in-phase and quadrature channels, rapid frequency changes while ignoring slow frequency changes.

17. An interrogator for an identification and telemetry system as claimed in claim 15, wherein the information extracted from the signals in each of the two channels includes an indication of the quality of the label reply or of the extraction process.

18. An interrogator for an identification and telemetry system, said interrogator comprising:
an antenna for transmitting an interrogation signal incorporating amplitude modulated radio frequency energy at an interrogation frequency, said radio frequency energy including a modulation waveform having, during a first period, a first amplitude and, during a second period, a second and lesser amplitude; means connected to said antenna for generating said interrogation signal; an antenna for receiving from a signal responding label, during said first period, an analog reply signal containing information and forming a complete reply message; means for separating the interrogation and said analog reply signals; means for converting said separated analog reply signal to a lower frequency band; and means for processing the separated analog reply signal to extract the label reply information, the improvement wherein the first period is of a length sufficient to receive from the label the complete reply message, and wherein said converting and processing means includes: first means for converting a component of the analog reply signal which is in phase with the interrogation signal to a lower frequency band to create a first base band channel; second means for converting a component of the analog reply signal which is in quadrature with the interrogation signal to a lower frequency band to create a second base band channel; separate means for sampling the converted analog reply signals in the first and second base band channels, at a rate sufficient to detect significant frequency components thereof; means for further converting the sampled values to digital form; means for storing the converted sampled values to create separate digital records of the in-phase and quadrature components of the analog reply received during the first period; and means for extracting said information during the second period by separate filtering and decoding of the stored sampled values in each of the two separate digital records; means for comparing results of said extraction; and means for choosing between the two extracted results such that one only of them is reported as the result of the interrogation.

19. An interrogator for an identification and telemetry system as claimed in claim 18, wherein the separate stored digital records of the reply signals in the in-phase and quadrature channels are decoded sequentially.

20. An interrogator for an identification and telemetry system as claimed in claim 18, wherein, if the result of decoding the channel first is satisfactory, decoding of the other channel does not proceed and the result of decoding is reported.

21. An interrogator for an identification and telemetry system as claimed in claim 19, wherein the strongest of the two replies in the in-phase and quadrature channels is selected for initial decoding.

22. An interrogator for an identification and telemetry system as claimed in claim 20, wherein decoding for each channel includes an hierarchy of checks for a satisfactory reply, and decoding of one channel is abandoned as soon as it becomes clear that an unsatisfactory reply in that channel has been received.

23. An interrogator for an identification and telemetry system as claimed in claim 22, wherein the time between interrogation pulses depends upon the time taken for decoding of the reply obtained from the previous interrogation pulse.

24. An interrogator for an identification and telemetry system as claimed in claim 18, wherein shaping of the interrogation signal envelope is such as to have zero amplitude during said second period.

25. An interrogator for an identification and telemetry system, said interrogator comprising:
an antenna for transmitting an interrogation signal incorporating amplitude modulated radio frequency energy at an interrogation frequency; means for generating said interrogation signal connected to said antenna; an antenna for receiving a complete label reply signal from a signal responding label containing an oscillator; means for separating the interrogation and reply signals; means for transmitting the separated reply signal to a receiver; and means within the receiver for decoding the reply signal; the improvement wherein: said radio frequency includes a modulation waveform having, during a first period, a first amplitude and during a second period, a second and lesser amplitude wherein said oscillator is used for forming said reply signal during said first period, and wherein the envelope of the interrogation signal is shaped to allow, during said first period, coherent operation of the oscillator within the label for a period sufficient for the label to transmit at least one complete label reply.

26. An interrogator for an identification and telemetry system as claimed in claim 25, wherein the amplitude and envelope of the interrogation signal is shaped so that the power which is transmitted during the first period of the interrogation signal is the largest possible subject to a need to achieve at least a required repetition rate of interrogations and to satisfy regulations which limit both peak to average power ratio and average power over a specified averaging period.

27. An interrogator for an identification and telemetry system as claimed in claim 25, wherein the amplitude and envelope of the interrogation pulse is shaped to achieve maximum interrogation range having regard to: dependence of label oscillator frequency upon power level reaching the label; a need for at least a required repetition rate of interrogations; and regulations which limit both peak to average power ratio and average power allowed over a specified averaging period.

28. An interrogator for an identification and telemetry system as claimed in claim 27, wherein the amplitude and envelope of the interrogation pulse is shaped to have regard to dependence of the level of transmitter noise in the frequency band used by the label reply signal, which is present in the receiver upon the label oscillator frequency.

29. An interrogator for an identification and telemetry system as claimed in claim 28, wherein shaping of the interrogation signal envelope is such as to have zero amplitude during said second period.

30. An interrogator for an identification and telemetry system, said interrogator comprising:
a transmitter containing means for generating an amplitude modulated radio frequency interrogation signal; an antenna connected to said transmitter for transmitting the amplitude modulated interrogation signal supplied by the transmitter; an antenna for receiving, from a signal responding label, a label reply signal; separation means for effecting coarse separation of said reply signal from said interrogation signal; a receiver connected to said separation means; an auxiliary coupling channel to feed a portion of the interrogation signal directly the receiver wherein it is combined with the reply signal emerging from said separation means; adjustment means for control of the amplitude and phase of the interrogation signal emerging from the auxiliary coupling channel; measurement means for determining of the amplitude and phase of the combined signal at the interrogation frequency reaching the receiver; an adaptive control block connected to said measurement means for producing control signals for said adjustment means; characterised in that said control block operates to optimise performance of the receiver.

31. An interrogator for an identification and telemetry system, said interrogator comprising:
a transmitter containing means for generating an amplitude modulated radio frequency interrogation signal;
an antenna connected to said transmitter for transmitting the amplitude modulated interrogation signal supplied by the transmitter; an antenna for receiving, from a signal responding label, a label reply signal; separation means for effecting coarse separation of said reply signal from said interrogation signal; a receiver connected to said separation means; an auxiliary coupling channel to feed a portion of the interrogation signal directly to the receiver wherein it is combined with the reply signal emerging from said separation means; adjustment means for control of the amplitude and phase of the interrogation signal emerging from the auxiliary coupling channel; and measurement means for determining of the amplitude and phase of the combined signal at the interrogation frequency reaching the receiver; the improvement wherein said interrogator includes an adaptive control block connected to said measurement means for producing control signals for said adjustment means, said control block being adapted to minimize direct coupling between said transmitter and receiver so as to optimise performance of the receiver.

32. An interrogator for an identification and telemetry system as claimed in claim 31, wherein the interrogator uses an amplitude modulated interrogation signal and the receiver uses a continuous wave local oscillator signal fed to a mixer which is used in the receiver, so that the signal level at the interrogation frequency reaching the receiver may be estimated by examining mixer output, even when mixers with imperfect isolation between the local oscillator input and mixer output are used.

33. An interrogator for an identification and telemetry system as claimed in claim 31, wherein the pass band of the auxiliary coupling channel is matched in its variation in amplitude and phase, relative to a centre value of the pass band, to corresponding behaviour of unwanted coupling between the transmitter and receiver arising from imperfections in said coarse separation means or from coupling between separate transmitter and receiver antennas.

34. An interrogator for an identification and telemetry system as claimed in claim 33, wherein said matching is achieved by use of broad band components in the antenna and duplexer systems of the interrogator.

35. An interrogator for an identification and telemetry system as claimed in claim 30, wherein said adaptive control block provides information on motion of objects within the field of the interrogator antenna.

36. An interrogator for an identification and telemetry system as claimed in claim 35, wherein said modulation waveform has during a first period a first amplitude and during a second period a second and lesser amplitude, and said information is used to shorten, for fast moving objects, elapsed time between high power periods of the interrogation signal.

37. An interrogator for an identification and telemetry system as claimed in claim 33, wherein shaping of the interrogation signal envelope is such as to have zero amplitude during said second period.

38. An interrogator for an identification and telemetry system, said interrogator comprising:
a transmitter for transmitting an interrogation signal including a modulation waveform having, during a first period a first amplitude and, during a second period a second and lesser amplitude; a generator for generating radio frequency energy at an interrogation frequency, a local oscillator signal for a receiver and said modulated interrogation signal for said transmitter; a transmitter antenna connected to said transmitter for transmitting said interrogation signal; an antenna for receiving from a signal responding label an analog reply signal containing information; a controllable phase shifter for adjusting relative phase of the reply signal and said local oscillator signal; an interrogator controller providing control signals to said phase shifter; means for converting the reply signal to a lower frequency band to create a low-frequency channel; means for extracting said information from a signal in said low-frequency channel; means for examining the quality of the extracted information; characterised in that the interrogator controller is programmed to significantly alter the phase shift provided by said phase shifter whenever the extracted information is judged to be unsatisfactory.

39. An interrogator for an identification and telemetry system as claimed in claim 38, wherein the significant alteration provided by the phase shifter is by an amount of 90 degrees.

40. An interrogator for an identification and telemetry system as claimed in claim 39, wherein the means for extracting said information, includes: means for sampling the signal in said low frequency channel, at a rate sufficient to detect significant components thereof; means for converting the sampled values to digital form; means for storing the converted sampled values to create a digital record of the analog reply signal; and means, in the time between relatively high power periods of the interrogation waveform, for filtering and decoding the stored sampled values to extract said information from said record.

41. An interrogator for an identification and telemetry system as claimed in claim 40, wherein shaping of the interrogation signal envelope is such as to have zero amplitude during said second period.

42. A signal responding label for an identification and telemetry system, said label comprising: a radio frequency antenna for receiving an interrogation signal at an interrogation frequency; a rectifier system containing a diode and providing a dc supply with positive and negative terminals for supplying power to an integrated circuit including a generator for generating a reply signal; a multiplexer within said generator, inputs of said multiplexer being connectable to said positive or negative terminals for effecting coding of the reply signal; characterised in that a larger portion of the reply signal is programmed at time of manufacture of the integrated circuit to include a fixed code and a cyclic redundancy check, while the remainder of the reply signal is programmed by means of connections made externally to the integrated circuit to contain a separate and shorter code, and an error correcting code.

43. A signal responding label for an identification and telemetry system as claimed in claim 42, including a voltage magnifying resonator having an inductance and a capacitance and a resonant frequency equal to said interrogation frequency, and wherein the capacitance of said resonator comprises substantially the junction capacitance of said diode.

44. A signal responding label as claimed in claim 8 wherein said diode provides at least part of the power required by said reply generator.

* * * * *